(12) United States Patent
von Behrens

(10) Patent No.: US 9,322,574 B2
(45) Date of Patent: Apr. 26, 2016

(54) CONCENTRATING SOLAR POWER WITH GLASSHOUSES

(71) Applicant: GLASSPOINT SOLAR, INC., Fremont, CA (US)

(72) Inventor: Peter Emery von Behrens, San Francisco, CA (US)

(73) Assignee: GlassPoint Solar, Inc., Fremont, CA (US)

(*) Notice: Subject to any disclaimer, the term of this patent is extended or adjusted under 35 U.S.C. 154(b) by 275 days.

(21) Appl. No.: 13/957,223

(22) Filed: Aug. 1, 2013

(65) Prior Publication Data

US 2014/0069416 A1 Mar. 13, 2014

Related U.S. Application Data

(63) Continuation of application No. PCT/US2012/025832, filed on Feb. 20, 2012.

(60) Provisional application No. 61/445,518, filed on Feb. 22, 2011.

(51) Int. Cl.
*F24J 2/12* (2006.01)
*F24J 2/14* (2006.01)
(Continued)

(52) U.S. Cl.
CPC . *F24J 2/12* (2013.01); *A01G 9/243* (2013.01); *F24J 2/07* (2013.01); *F24J 2/1057* (2013.01); *F24J 2/14* (2013.01); *F24J 2/42* (2013.01); *F24J 2/52* (2013.01); *F24J 2/5241* (2013.01); *F24J 2/541* (2013.01);
(Continued)

(58) Field of Classification Search
CPC ............ F24J 2/12; F24J 2/52; F24J 2/10; G02B 5/10
USPC ............ 126/694, 604, 600, 603; 136/246; 350/310, 292, 288
See application file for complete search history.

(56) References Cited

U.S. PATENT DOCUMENTS 1,240,890 A   9/1917   Shuman et al.
2,217,593 A   10/1940  London
(Continued)

FOREIGN PATENT DOCUMENTS

CN   2050918 U   1/1990
CN   2926930 Y   7/2007
(Continued)

OTHER PUBLICATIONS

Search Report issued for Chinese Patent Application No. 201080006211.6 issued Feb. 17, 2013.
(Continued)

*Primary Examiner* — Gregory Huson
*Assistant Examiner* — Nikhil Mashruwala
(74) *Attorney, Agent, or Firm* — Perkins Coie LLP

(57) ABSTRACT

A protective transparent enclosure, such as a greenhouse, encloses a concentrated solar power system having line-focus solar energy concentrators. The line-focus solar energy concentrators have a reflective front layer, a core layer, and a rear layer. The core and the rear layers, when bonded with the reflective front layer, enable the line-focus solar energy concentrator, in some embodiments, to retain a particular form without additional strengthening elements. In some embodiments, the core layer and/or the rear layer are formed by removing material from a single piece of material.

21 Claims, 17 Drawing Sheets

(51) Int. Cl.
   *F24J 2/42* (2006.01)
   *F24J 2/54* (2006.01)
   *F24J 2/07* (2006.01)
   *F24J 2/52* (2006.01)
   *A01G 9/24* (2006.01)
   *F24J 2/10* (2006.01)

(52) U.S. Cl.
   CPC .. *F24J 2002/1023* (2013.01); *F24J 2002/1028* (2013.01); *Y02E 10/41* (2013.01); *Y02E 10/45* (2013.01); *Y02E 10/47* (2013.01); *Y02P 60/124* (2015.11); *Y10T 29/49355* (2015.01)

(56) References Cited

U.S. PATENT DOCUMENTS

| | | |
|---|---|---|
| 2,221,919 A | 11/1940 | Kenan |
| 2,859,745 A | 11/1958 | Von Brudersdorff |
| 3,672,572 A | 6/1972 | Delfs |
| 3,847,136 A | 11/1974 | Salvail |
| 3,923,039 A | 12/1975 | Falbel |
| 3,962,873 A | 6/1976 | Davis |
| 3,991,740 A | 11/1976 | Rabl |
| 3,994,279 A | 11/1976 | Barak |
| 3,994,341 A | 11/1976 | Anderson et al. |
| 3,996,917 A | 12/1976 | Trihey |
| 4,003,366 A | 1/1977 | Lightfoot |
| 4,015,585 A | 4/1977 | Fattor |
| 4,078,549 A | 3/1978 | McKeen et al. |
| 4,083,155 A | 4/1978 | Lampert |
| 4,088,116 A | 5/1978 | Pastor |
| 4,094,717 A * | 6/1978 | Barr ........................ F24J 2/0488 156/197 |
| 4,095,369 A | 6/1978 | Posnansky et al. |
| 4,108,154 A | 8/1978 | Nelson |
| 4,122,832 A | 10/1978 | Hirschsohn et al. |
| 4,124,277 A | 11/1978 | Stang |
| 4,149,523 A | 4/1979 | Boy-Marcotte et al. |
| 4,159,712 A | 7/1979 | Legg |
| 4,174,752 A | 11/1979 | Slater et al. |
| 4,184,482 A | 1/1980 | Cohen |
| 4,202,322 A | 5/1980 | Delgado et al. |
| 4,209,222 A | 6/1980 | Posnansky |
| 4,219,008 A | 8/1980 | Schultz |
| RE30,407 E | 9/1980 | Lightfoot |
| 4,230,095 A | 10/1980 | Winston |
| 4,237,864 A | 12/1980 | Kravitz |
| 4,249,340 A | 2/1981 | Maes, Jr. |
| 4,258,696 A | 3/1981 | Gopal |
| 4,262,653 A | 4/1981 | Holland et al. |
| 4,263,893 A | 4/1981 | Pavlak et al. |
| 4,280,480 A | 7/1981 | Raposo |
| 4,282,394 A | 8/1981 | Lackey et al. |
| 4,287,880 A | 9/1981 | Geppert |
| 4,290,419 A | 9/1981 | Rabedeaux |
| 4,314,604 A | 2/1982 | Koller |
| 4,318,394 A | 3/1982 | Alexander |
| 4,333,447 A | 6/1982 | Lemrow et al. |
| 4,343,533 A | 8/1982 | Currin et al. |
| 4,371,623 A | 2/1983 | Taylor |
| 4,372,386 A | 2/1983 | Rhoades et al. |
| 4,386,600 A | 6/1983 | Eggert, Jr. |
| 4,392,531 A | 7/1983 | Ippolito et al. |
| 4,410,156 A | 10/1983 | Pischzik |
| 4,423,719 A | 1/1984 | Hutchison |
| 4,445,499 A | 5/1984 | Platell |
| 4,452,229 A | 6/1984 | Powers et al. |
| 4,462,390 A | 7/1984 | Holdridge et al. |
| 4,484,568 A | 11/1984 | Witt |
| 4,490,926 A * | 1/1985 | Stokes ........................ 34/76 |
| 4,577,679 A | 3/1986 | Hibshman et al. |
| 4,597,377 A | 7/1986 | Melamed |
| 4,628,142 A | 12/1986 | Hashizume |
| 4,727,854 A | 3/1988 | Johnson |
| 4,741,161 A | 5/1988 | Belart et al. |
| 5,018,576 A | 5/1991 | Udell et al. |
| 5,048,507 A | 9/1991 | Ridett |
| 5,058,675 A | 10/1991 | Travis |
| 5,103,524 A | 4/1992 | Vowles |
| 5,191,876 A | 3/1993 | Atchley |
| 5,258,101 A | 11/1993 | Breu |
| 5,344,496 A | 9/1994 | Stern et al. |
| 5,347,402 A | 9/1994 | Arbogast |
| 5,520,747 A | 5/1996 | Marks |
| 5,524,610 A | 6/1996 | Clark |
| 5,699,785 A | 12/1997 | Sparkman |
| 5,851,309 A | 12/1998 | Kousa |
| 5,941,238 A | 8/1999 | Tracy et al. |
| 5,954,046 A | 9/1999 | Wegler |
| 6,017,002 A | 1/2000 | Burke et al. |
| 6,129,844 A | 10/2000 | Dobelmann |
| 6,220,339 B1 | 4/2001 | Krecke |
| 6,233,914 B1 | 5/2001 | Fisher |
| 6,294,723 B2 | 9/2001 | Uematsu et al. |
| 6,363,928 B1 | 4/2002 | Anderson, Jr. |
| 6,485,152 B2 | 11/2002 | Wood |
| 6,508,850 B1 | 1/2003 | Kotliar |
| 7,028,685 B1 | 4/2006 | Krecke |
| 7,055,519 B2 | 6/2006 | Litwin |
| 7,337,843 B2 | 3/2008 | Mecham et al. |
| 7,472,548 B2 | 1/2009 | Meksvanh et al. |
| 7,748,137 B2 | 7/2010 | Wang |
| 7,858,875 B2 | 12/2010 | Lu |
| 7,975,686 B2 | 7/2011 | Prueitt |
| 7,992,553 B2 | 8/2011 | Le Lievre |
| 8,056,555 B2 | 11/2011 | Prueitt |
| 8,333,186 B2 | 12/2012 | Jennings |
| 8,342,169 B2 | 1/2013 | Glynn |
| 8,397,434 B2 | 3/2013 | Bayne |
| 8,430,090 B2 | 4/2013 | Angel et al. |
| 8,604,333 B2 | 12/2013 | Angel et al. |
| 8,701,773 B2 | 4/2014 | O'Donnell et al. |
| 8,739,774 B2 | 6/2014 | O'Donnell et al. |
| 8,748,731 B2 | 6/2014 | MacGregor et al. |
| 8,752,542 B2 | 6/2014 | O'Donnell et al. |
| 8,887,712 B2 | 11/2014 | von Behrens |
| 8,915,244 B2 * | 12/2014 | von Behrens ................. 126/692 |
| 2001/0008144 A1 | 7/2001 | Uematsu et al. |
| 2002/0108745 A1 | 8/2002 | Kimura et al. |
| 2003/0080604 A1 | 5/2003 | Vinegar et al. |
| 2003/0188477 A1 | 10/2003 | Pasternak |
| 2004/0004303 A1 | 1/2004 | Iskra |
| 2004/0055594 A1 | 3/2004 | Hochberg et al. |
| 2006/0048770 A1 | 3/2006 | Meksvanh et al. |
| 2006/0124360 A1 | 6/2006 | Lee et al. |
| 2007/0056726 A1 | 3/2007 | Shurtleff |
| 2007/0209365 A1 | 9/2007 | Hamer et al. |
| 2008/0066736 A1 | 3/2008 | Zhu |
| 2008/0083405 A1 | 4/2008 | Kimura et al. |
| 2008/0163864 A1 | 7/2008 | Larson |
| 2008/0216822 A1 | 9/2008 | Lazzara et al. |
| 2008/0236227 A1 | 10/2008 | Flynn |
| 2008/0308094 A1 | 12/2008 | Johnston |
| 2009/0056698 A1 | 3/2009 | Johnson et al. |
| 2009/0056699 A1 | 3/2009 | Mills et al. |
| 2009/0056704 A1 | 3/2009 | Donati et al. |
| 2009/0056944 A1 | 3/2009 | Nitschke |
| 2009/0199847 A1 | 8/2009 | Hawley |
| 2009/0260359 A1 | 10/2009 | Palkes |
| 2009/0277224 A1 | 11/2009 | Angel et al. |
| 2009/0277440 A1 | 11/2009 | Angel et al. |
| 2009/0294092 A1 | 12/2009 | Bahl et al. |
| 2009/0320830 A1 | 12/2009 | Bennett |
| 2010/0000733 A1 | 1/2010 | Chiesa et al. |
| 2010/0051016 A1 | 3/2010 | Ammar |
| 2010/0051021 A1 | 3/2010 | Kunz |
| 2010/0095622 A1 * | 4/2010 | Niemoller ................. B32B 3/12 52/407.5 |
| 2010/0175687 A1 | 7/2010 | Zillmer et al. |
| 2010/0282288 A1 * | 11/2010 | Cornfeld ........... H01L 31/02008 136/244 |
| 2010/0300431 A1 | 12/2010 | Carrascosa Perez et al. |
| 2011/0017274 A1 | 1/2011 | Huang et al. |
| 2011/0088686 A1 | 4/2011 | Hochberg et al. |

(56) References Cited

U.S. PATENT DOCUMENTS

| | | | |
|---|---|---|---|
| 2011/0126824 A1 | 6/2011 | Conlon et al. |
| 2011/0174935 A1 | 7/2011 | Bingham et al. |
| 2011/0203574 A1 | 8/2011 | Harding |
| 2011/0203577 A1 | 8/2011 | Coduri |
| 2011/0240006 A1 | 10/2011 | Linke et al. |
| 2011/0277470 A1 | 11/2011 | Benyaminy et al. |
| 2011/0291405 A1 | 12/2011 | Burger et al. |
| 2012/0067337 A1 | 3/2012 | Hall et al. |
| 2012/0125400 A1 | 5/2012 | Angel et al. |
| 2012/0125611 A1 | 5/2012 | Ayirala et al. |
| 2012/0138293 A1 | 6/2012 | Kaminsky et al. |
| 2012/0138316 A1 | 6/2012 | Matzakos |
| 2012/0152307 A1* | 6/2012 | MacGregor | F24J 2/1047 136/246 |
| 2012/0167873 A1 | 7/2012 | Venetos et al. |
| 2012/0234311 A1 | 9/2012 | Johnson et al. |
| 2012/0255309 A1 | 10/2012 | Venetos et al. |
| 2013/0146122 A1* | 6/2013 | Chung | H01L 31/02013 136/246 |
| 2013/0206134 A1 | 8/2013 | O'Donnell et al. |
| 2013/0220305 A1 | 8/2013 | von Behrens |
| 2014/0069416 A1 | 3/2014 | von Behrens |
| 2014/0190469 A1 | 7/2014 | O'Donnell et al. |
| 2014/0216717 A1 | 8/2014 | O'Donnell et al. |
| 2014/0326234 A1 | 11/2014 | O'Donnell et al. |
| 2014/0345599 A1 | 11/2014 | O'Donnell et al. |
| 2014/0347757 A1 | 11/2014 | MacGregor et al. |
| 2015/0144125 A1 | 5/2015 | von Behrens |
| 2015/0285048 A1 | 10/2015 | O'Donnell et al. |
| 2015/0285490 A1 | 10/2015 | O'Donnell et al. |
| 2015/0295158 A1 | 10/2015 | O'Donnell et al. |

FOREIGN PATENT DOCUMENTS

| | | |
|---|---|---|
| CN | 200958464 Y | 10/2007 |
| CN | 201059795 Y | 5/2008 |
| CN | 101270675 A | 9/2008 |
| CN | 101280966 A | 10/2008 |
| CN | 101354191 A | 1/2009 |
| CN | 101363958 A | 2/2009 |
| CN | 201359397 Y | 12/2009 |
| DE | 102004013590 | 10/2005 |
| DE | 202005021000 U1 | 1/2007 |
| EP | 0506568 A1 | 9/1992 |
| EP | 0946432 B1 | 10/1999 |
| EP | 988493 B1 | 3/2000 |
| FR | 2696753 A1 | 4/1994 |
| JP | 56085508 | 7/1981 |
| JP | 2001082104 | 3/2001 |
| JP | 2012106282 A | 6/2012 |
| KR | 10-2008-0024309 | 3/2008 |
| WO | WO-2007146183 A2 | 12/2007 |
| WO | 2009002772 A2 | 12/2008 |
| WO | WO-2008153922 A1 | 12/2008 |
| WO | 2009105643 A2 | 8/2009 |
| WO | WO-2009126875 A2 | 10/2009 |
| WO | WO-2010032095 A2 | 3/2010 |
| WO | 2010043744 A2 | 4/2010 |
| WO | WO2010040957 | 4/2010 |
| WO | WO-2010088632 A2 | 8/2010 |
| WO | WO 2010088632 A2 * | 8/2010 | F24J 2/24 |
| WO | WO-2011053863 A2 | 5/2011 |
| WO | WO-2012006255 A2 | 1/2012 |
| WO | WO-2012006257 A2 | 1/2012 |
| WO | WO-2012006258 A2 | 1/2012 |
| WO | WO-2012128877 A2 | 9/2012 |

OTHER PUBLICATIONS

BrightSource Limitless, "Coalinga Project Facts, A BrightSource Energy Concentrating Solar Power Project," Fact Sheet, accessed Sep. 19, 2013, http://www.brightsourceenergy.com/stuff/contentmgr/files/0/ad5d33a2bc493a5079b5dda609724238/folder/coalinga_fact_sheet.pdf, 2 pages.
BrightSource Limitless, "Enhanced Oil Recovery Project—Coalinga," accessed Sep. 19, 2013, http://www.brightsourceenergy.com/coalinga, 2 pages.
Lim, Hyung Gun, PCT/US2010/022780 PCT International Search Report, Oct. 13, 2010, entire document, Korean Intellectual Property Office, Seo-gu, Republic of Korea.
Lim, Hyung Gun, PCT/US2010/022780 PCT Written Opinion, Oct. 13, 2010, entire document, Korean Intellectual Property Office, Seo-gu, Republic of Korea.
Linder, Nora, PCT/US2010/022780 PCT International Preliminary Report on Patentability, Aug. 2, 2011, entire document, International Bureau of WIPO, Geneva, Switzerland.
International Search Report and Written Opinion issued in PCT/US2011/042891 and mailed Mar. 12, 2012.
Ham, Joung Hyun, PCT/US2011/1042906 PCT International Search Report, Mar. 9, 2012, entire document (4 pages), Korean Intellectual Property Office, Seo-gu, Republic of Korea.
Ham, Joung Hyun, PCT/US2011/1042906 PCT Written Opinion, Mar. 9, 2012, entire document (6 pages), Korean Intellectual Property Office, Seo-gu, Republic of Korea.
International Search Report issued in PCT/US2011/042968 completed on Mar. 9, 2012 (3 pages).
International Preliminary Report on Patentability and Written Opinion of International Application No. PCT/US2011/042698 mailed Jan. 17, 2013, 6 pages.
Ha, Jeong Kyun, PCT/US2011/042907 PCT Written Opinion, Feb. 24, 2012, entire document, Korean Intellectual Property Office, Seo-gu, Republic of Korea.
Ha, Jeong Kyun, PCT/US2011/042907 PCT International Search Report, Feb. 24, 2012, entire document, Korean Intellectual Property Office, Seo-gu, Republic of Korea.
International Search Report and Written Opinion issued in PCT/US2012/025832, mailed Oct. 23, 2012, 9 pages.
Wilson, Bob. "Re: Why does a bridge have rollers under it? How do the rollers of a bridge work?", Newton Ask a Scientist! (DOE Office of Science) [online], Jan. 2, 2008 [retrieved from the internet <URL:http://web.archive.org/web/20080102111713/http://www.newton.dep.anl.gov/askasci/eng99/eng99556.htm>.
The Linde Group, "Enhanced Oil Recovery (EOR)", 1 page, accessed Oct. 7, 2013.
Champion Technologies, "Enhanced Oil Recovery." 2 pages, accessed Oct. 7, 2013.
Adventures in Energy, "Extracting Oil and Natural Gas." 1 pages, accessed Oct. 7, 2013.
Adventures in Energy, "Separating Oil, Natural Gas and Water." 1 page, accessed Oct. 7, 2013.
Proz, 'On the edge of manufacturing tolerance' [bulletin board], Mar. 12, 2005 [retrieved on Jan. 7, 2014]. Retrieved from the internet <http://www.proz.com/kudoz/English/military_defense/968330-on_the_edge_of_manufacturing_tolerance.html>.
Bierman et al "Performance of Enclosed Trough OTSG for Enhanced Oil Recovery," SolarPaces 2013, pp. 11.
Bierman et al "Solar Enhanced Oil Recovery Plant in South Oman," SolarPaces 2013; pp. 10.
U.S. Appl. No. 14/918,489, filed Oct. 20, 2015, O'Donnell, John S., et al.
U.S. Appl. No. 14/920,700, filed Oct. 22, 2015, O'Donnell, John S., et al.

* cited by examiner

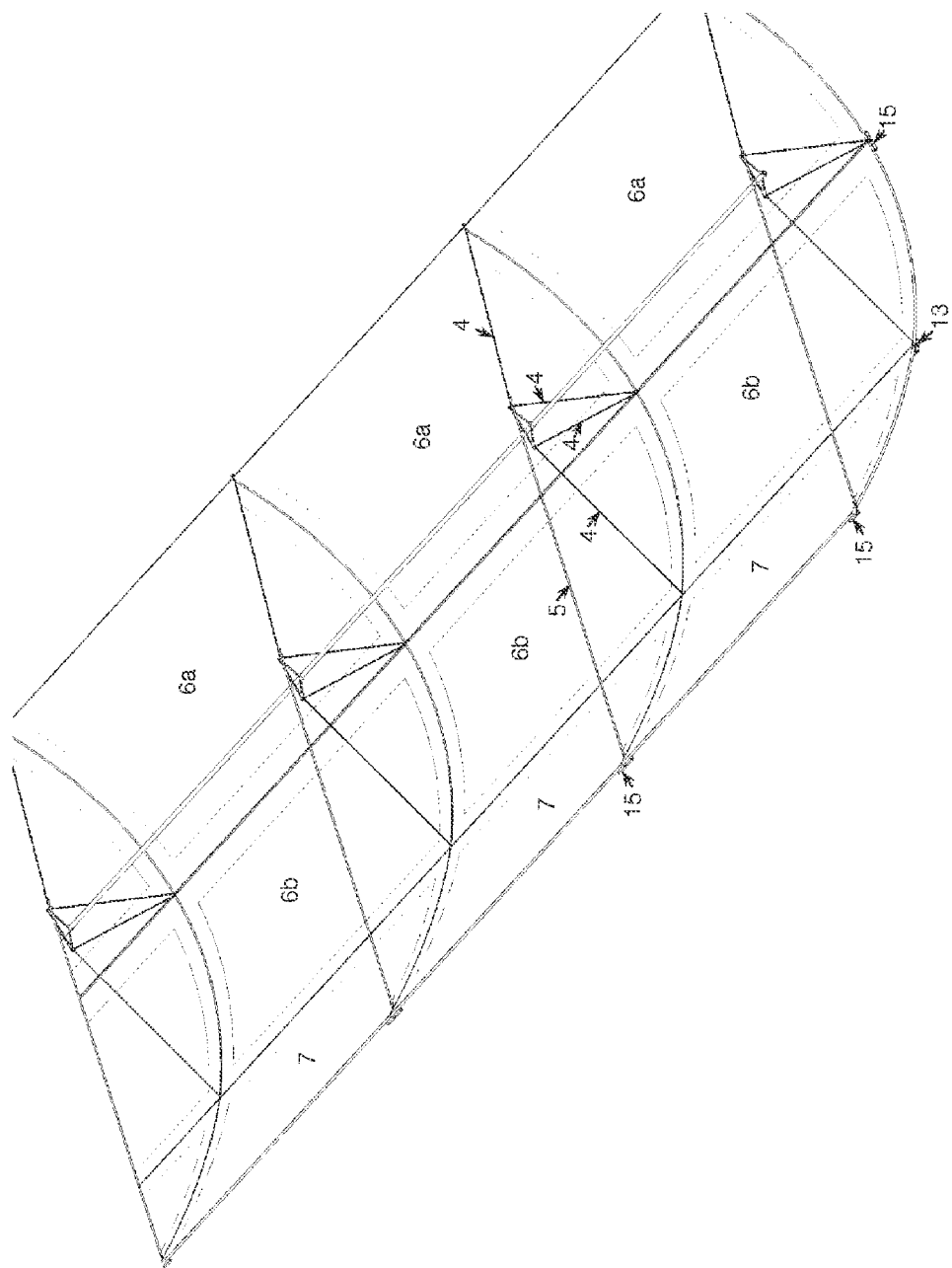

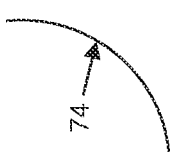
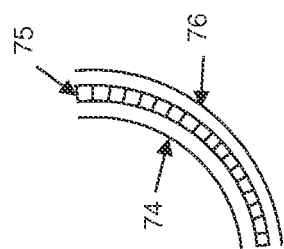
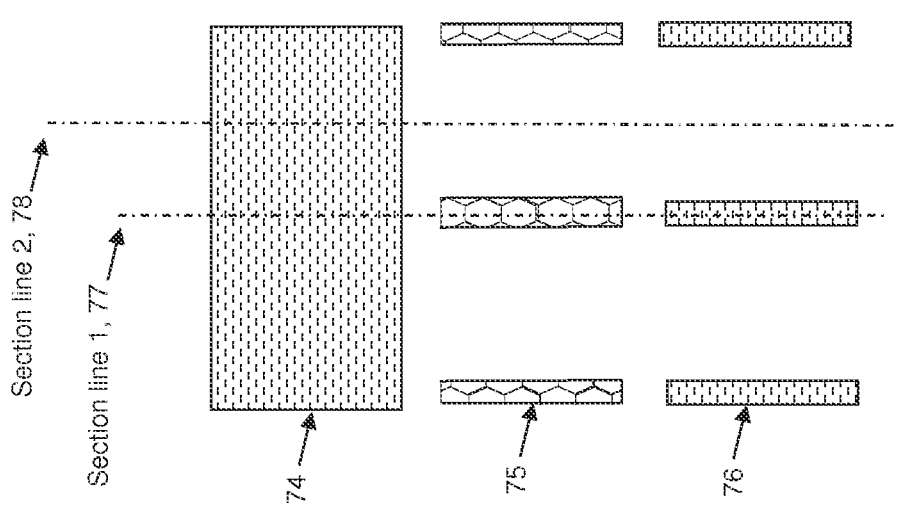

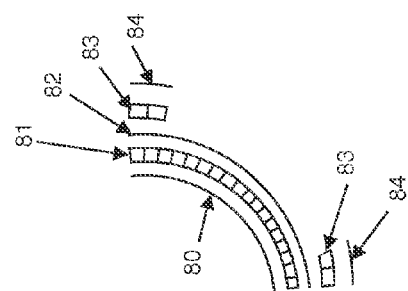
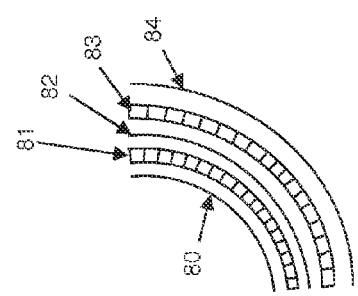
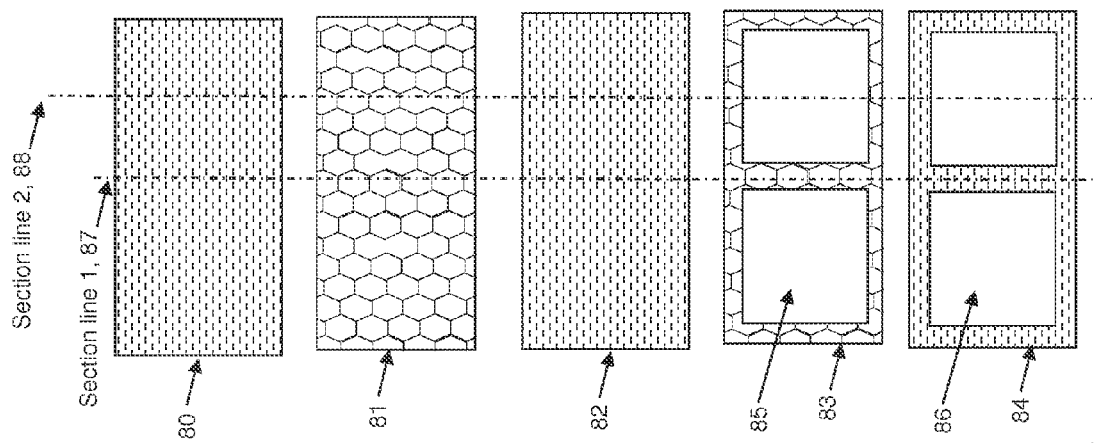

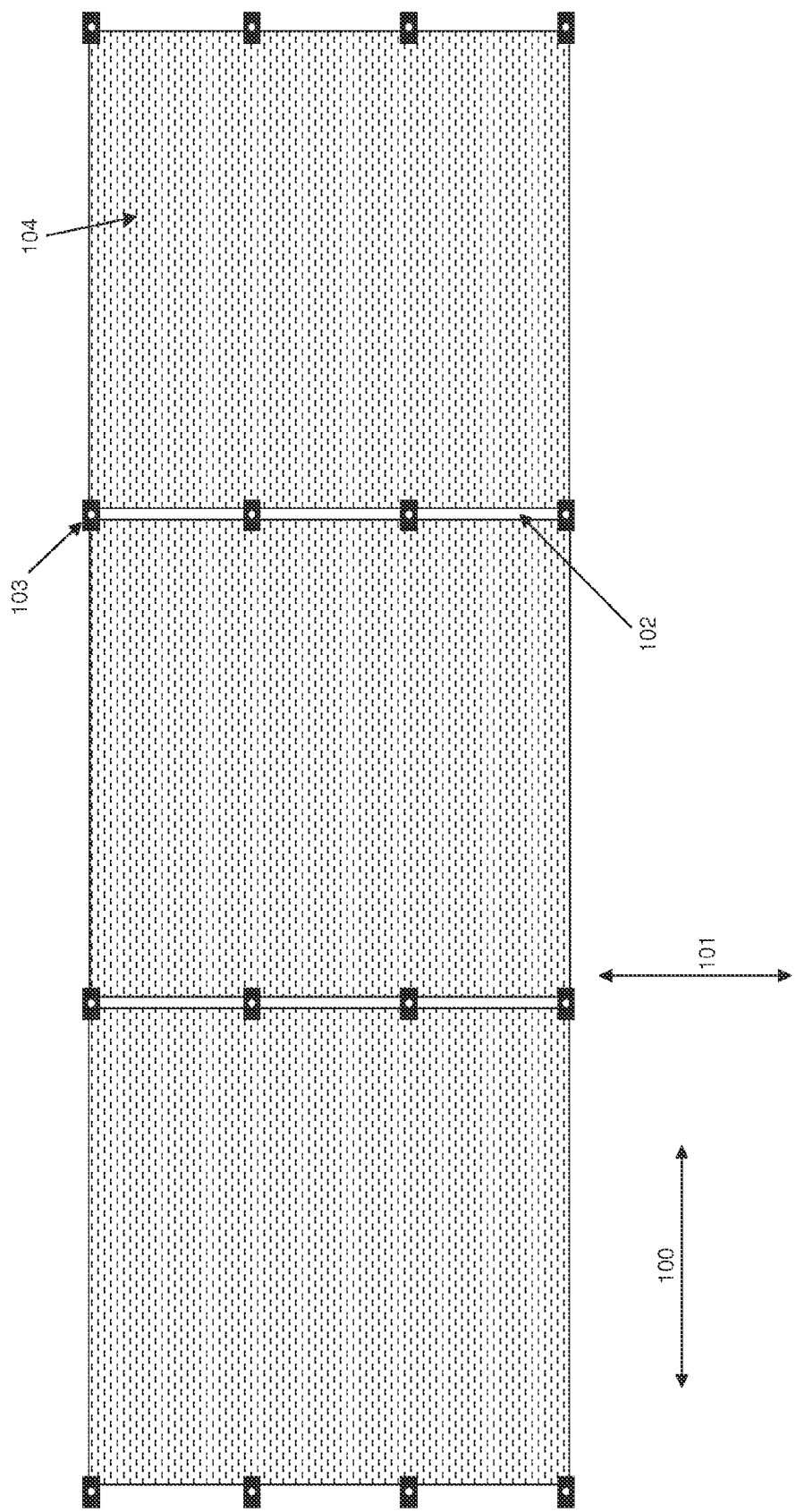

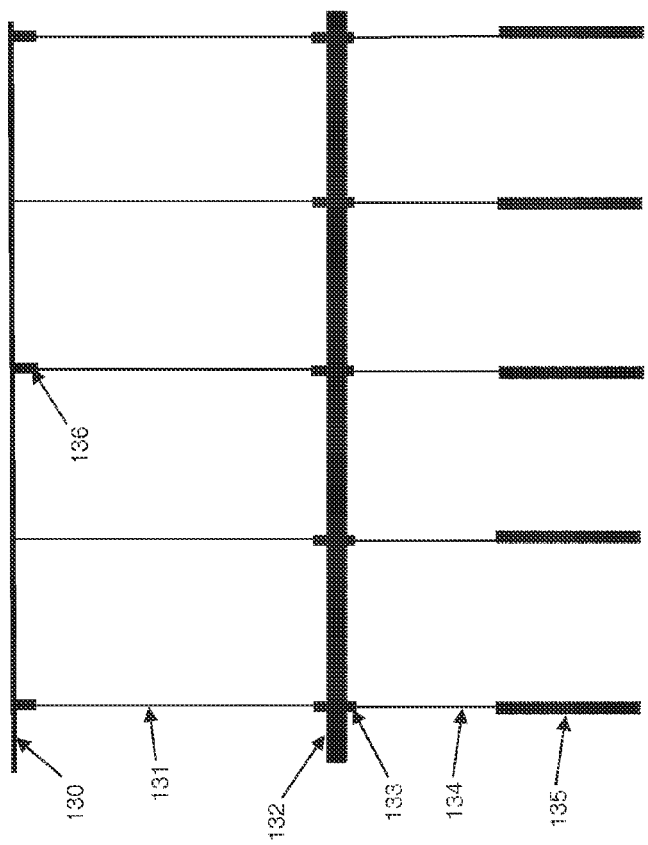
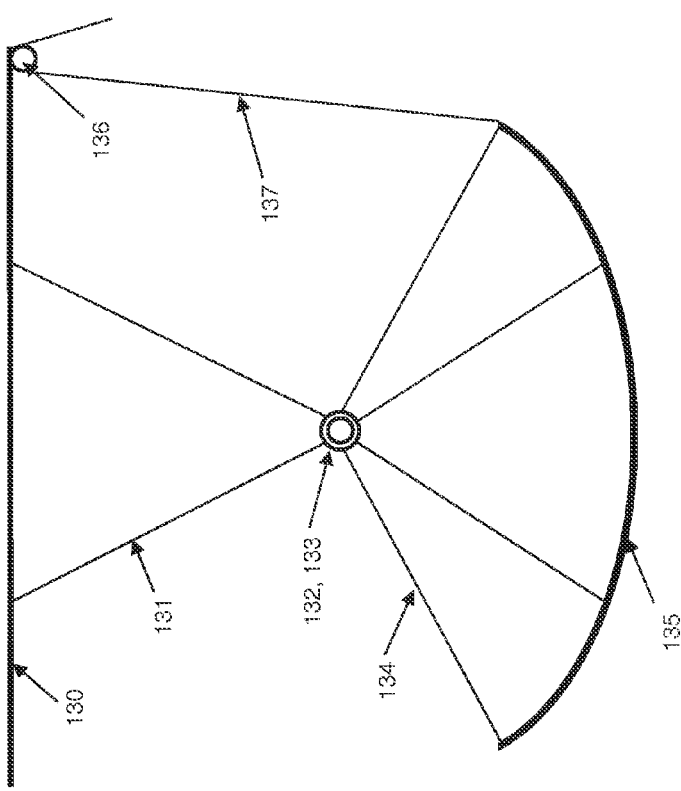
Fig. 13c
Fig. 13a

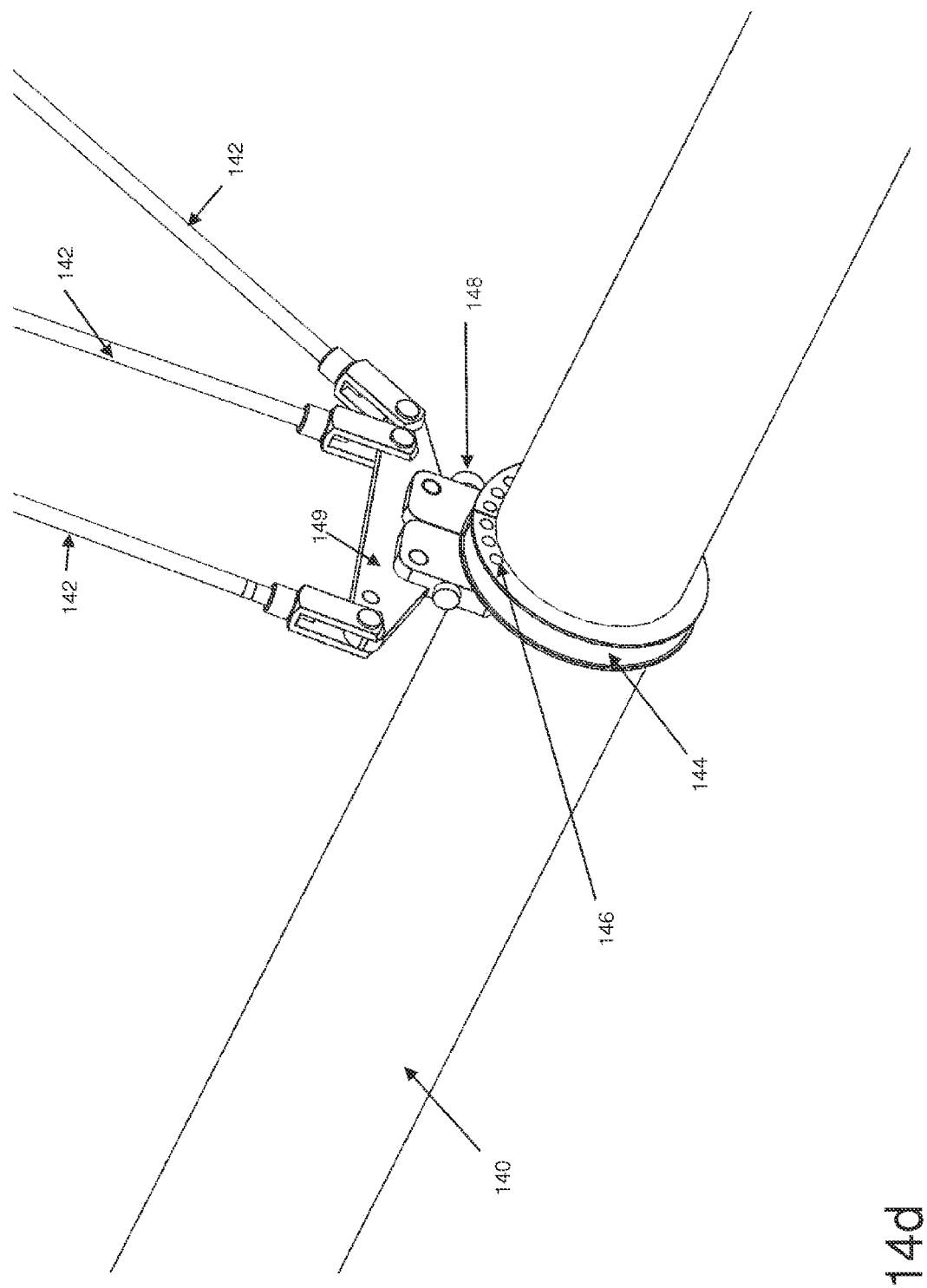

CONCENTRATING SOLAR POWER WITH GLASSHOUSES

CROSS REFERENCE TO RELATED APPLICATIONS

This application is a Continuation of PCT/US2012/025832 filed Feb. 20, 2012 entitled "CONCENTRATING SOLAR POWER WITH GLASSHOUSES", which claims benefit of priority to U.S. Provisional Application No. 61/445,518, filed Feb. 22, 2011 entitled "CONCENTRATING SOLAR POWER WITH GLASSHOUSES. To the extent permitted by the type of the instant application, this application incorporates by reference for all purposes the following applications, all commonly owned with the instant application at the time the invention was made:

PCT Application (Serial No. PCT/US10/22780), filed Feb. 1, 2010, first named inventor Roderick MacGregor, and entitled Concentrating Solar Power with Glasshouses;

U.S. Provisional Application Ser. No. 61/361,509, filed Jul. 5, 2010, first named inventor Peter Von Behrens, and entitled Concentrating Solar Power with Glasshouses; and U.S. Provisional Application Ser. No. 61/445,518, filed Feb. 22, 2011, first named inventor Peter Von Behrens, and entitled Concentrating Solar Power with Glasshouses.

BACKGROUND

1. Field

Advancements in concentrated solar thermal power (CST), photovoltaic solar energy (PV), concentrated photovoltaic solar energy (CPV), and industrial use of concentrated solar thermal energy are needed to provide improvements in performance, efficiency, and utility of use.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Concentrated solar power systems use mirrors, known as concentrators, to gather solar energy over a large space and aim and focus the energy at receivers that convert incoming solar energy to another form, such as heat or electricity. There are several advantages, in some usage scenarios, to concentrated systems over simpler systems that directly use incident solar energy. One advantage is that more concentrated solar energy is more efficiently transformed to heat or electricity than less concentrated solar energy. Thermal and photovoltaic solar receivers operate more efficiently at higher incident solar energy levels. Another advantage is that non-concentrated solar energy receivers are, in some usage scenarios, more expensive than mirror systems used to concentrate sunlight. Thus, by building a system with mirrors, total cost of gathering sunlight over a given area and converting the gathered sunlight to useful energy is reduced.

A line-focus receiver is a receiver with a target that is a relatively long straight line, like a pipe. A line-focus concentrator is a reflector (made up of a single smooth reflective surface, multiple fixed facets, or multiple movable Fresnel facets) that receives sunlight over a two dimensional space and concentrates the sunlight into a significantly smaller focal point in one dimension (width) while reflecting the sunlight without concentration in the other dimension (length) thus creating a focal line. A line-focus concentrator with a line-focus receiver at its focal line is a basic trough system. The concentrator is optionally rotated in one dimension around its focal line to track daily or seasonal (apparent) movement of the sun to improve total energy capture and conversion.

A parabolic trough system is a line concentrating system using a monolithic reflector shaped like a large half pipe having a shape defined by the equation $y^2=4$ fx where f is the focal length of the trough. The reflector has a 1-dimensional curvature to focus sunlight onto a line-focus receiver or approximates such curvature through multiple facets fixed relative to each other.

A concentrating Fresnel reflector is a line concentrating system similar to the parabolic trough replacing the trough with a series of mirrors, each the length of a receiver, that are flat or alternatively slightly curved in width. Each mirror is individually rotated about its long axis to aim incident sunlight onto the line-focus receiver.

In some concentrated solar systems, such as some systems with high concentration ratios, overall system is cost dominated by various elements such as the concentration system (such as a mirror or lens), a support system for the concentrators, and motors and mechanisms that enable tracking movement of the sun. The elements dominate the costs because the elements are enabled to withstand wind and weather. In some usage scenarios, solar energy systems are enabled to withstand various environmental dangers such as wind, rain, snow, ice, hail, dew, rodents, birds and other animals, dust, sand, moss, and other living organisms. Reflectivity of a concentrator is sensitive to damage, tarnishing, and dirt buildup since only directly reflected sunlight, not scattered sunlight, is effectively focused.

Glass mirrors are used in some concentrated systems, because of an ability to maintain good optical properties over long design lives (e.g. 30 years) of concentrated solar systems. Glass is relatively fragile and vulnerable to hail and other forms of damage unless it is suitably thick, e.g. 4-5 mm for relatively larger mirrors. In a 400 square foot concentrating dish the thickness results in a weight of close to 1000 lbs or about nine kg per square meter of concentrator area. The mirror is formed in a precise curve, in one dimension for a trough, in two dimensions for a dish, to focus sunlight.

In some concentrated systems, mirror surfaces cease to focus as intended if warped. Thus, the reflector is supported and held in shape by a metal superstructure that is shaped to the curved glass. The superstructure supports and protects the mirror from environmental conditions such as winds of 75 mph or more. The protection from winds adds an additional 10,000 lbs of load beyond the 1000 lb weight of the mirror, resulting in complex construction requiring roughly 20 kg of structural steel for every square meter of mirror area in a dish system.

SYNOPSIS

The invention may be implemented in numerous ways, including as a process, an article of manufacture, an apparatus, a system, and a composition of matter. In this specification, these implementations, or any other form that the invention may take, may be referred to as techniques. The Detailed Description provides an exposition of one or more embodiments of the invention that enable improvements in performance, efficiency, and utility of use in the field identified above. The Detailed Description includes an introduction to facilitate the more rapid understanding of the remainder of the Detailed Description. As is discussed in more detail in the Conclusions, the invention encompasses all possible modifications and variations within the scope of the issued claims.

BRIEF DESCRIPTION OF DRAWINGS

FIG. 3 illustrates a perspective view of selected details of an embodiment of a parabolic trough solar concentrator with a unilateral extension, a solar receiver, and a suspension mechanism that enable the solar concentrator to rotate about the solar receiver.

FIGS. 6b and 6c respectively illustrate exploded section views referenced, respectively, to Section lines 1 72 and 2 73 of FIG. 6a.

FIG. 7a illustrates, in plan view, an embodiment of mirror construction via a sandwich structured composite having two skins (front and rear) and one core, with the core and the rear skin sections built from strips of material. Each layer is illustrated separately, not as stacked during construction.

FIGS. 7b and 7c respectively illustrate exploded section views referenced, respectively, to Section lines 1 77 and 2 78 of FIG. 7a.

FIG. 8a illustrates, in plan view, an embodiment of mirror construction via a sandwich structured composite having three skins (front, middle, and rear) and two cores (front and rear), with sections removed from the rear core and the rear skin. Each layer is illustrated separately, not as stacked during construction.

FIGS. 8b and 8c illustrate exploded section views referenced, respectively, to Section lines 1 87 and 2 88 of FIG. 8a.

FIGS. 9b and 9c illustrate exploded section views referenced, respectively, to Section lines 1 97 and 2 98 of FIG. 9a.

FIG. 10 illustrates, in plan view as seen from the non-reflective (e.g. back) side of the mirror, an embodiment of mirror construction via a sandwich structured composite having multiple pre-formed mirror segments, each segment implementing a full aperture of a mirror shape as joined by flanges.

FIG. 13a illustrates, in side elevation view looking down a trough of a mirror lengthwise, an embodiment of a suspension mechanism of the mirror, with the mirror suspension mechanism in a horizontal position.

FIG. 13c illustrates, in front elevation view, an embodiment of the suspension mechanism of FIGS. 13a and 13b.

FIG. 14d illustrates selected details of FIG. 14a, with elements connecting to the solar concentrator omitted for clarity.

DETAILED DESCRIPTION

Figure 1:
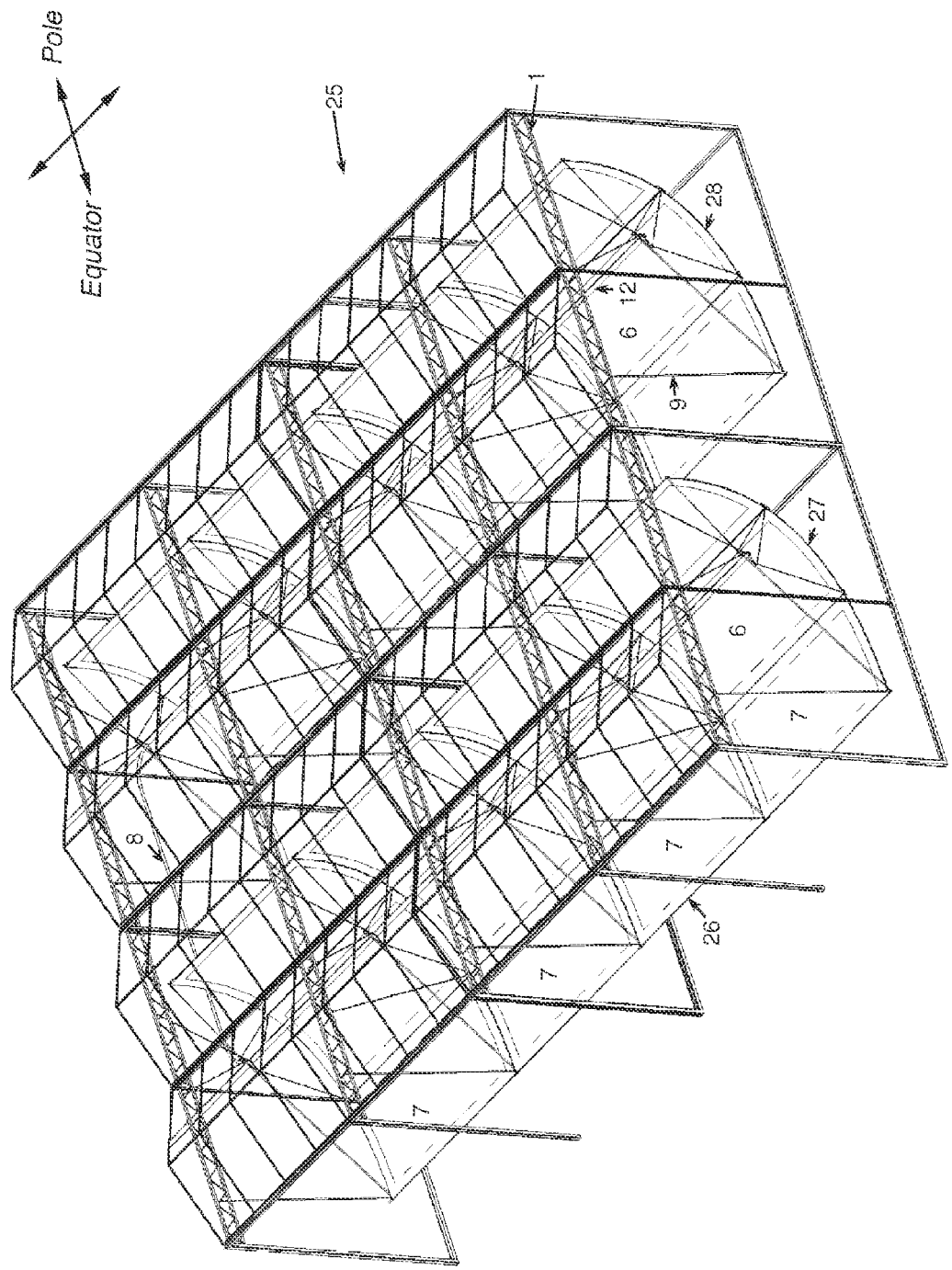
FIG. 1 illustrates a perspective view of selected details of a portion of an embodiment of an enclosing greenhouse and an enclosed concentrated solar energy system utilizing a parabolic trough with a unilateral extension.

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In some circumstances, techniques described herein enable cost reduction of concentrated solar power systems. In various embodiments, collection (concentration and conversion of solar energy) is separated from protection. A protective transparent exoskeleton (such as a glasshouse or a greenhouse) surrounds and/or encloses collecting elements (or alternatively the collecting elements are placed in the exoskeleton), enabling the collecting elements (mirrors, lenses, etc) to be less robust than otherwise required. By separating collecting and protecting functions, and leveraging off-the-shelf technology (e.g. highly engineered, cost effective, and proven greenhouse technology, such as glass growers greenhouse technology) for the protection function, in some circumstances a reduction in cost and complexity of a system (such as mirrors/lenses, support structure, foundations, tracking mechanisms, etc.) is enabled with a relatively minimal impact on overall performance. The glasshouse is relatively low to the ground with little wind force bearing surfaces, and is designed to withstand wind and weather with a relatively minimal structural skeleton. Because the glasshouse reduces wind forces acting on the collector and receiver elements, the mirrors or lenses used for collection and concentration inside the exoskeletal protection of the glasshouse are enabled to be lightweight, in some embodiments, to a point of seeming flimsy, and thus are relatively less costly to construct, transport, support and aim, and have little or no weatherization costs. Note that within this disclosure, the terms glasshouse and greenhouse are used interchangeably, and are not meant to necessarily imply any sort of horticultural activity.

The protected embodiment techniques enable reflectors built from lighter materials with simpler and lighter frames since wind, weather, and UV light are reduced inside a glasshouse enclosure. Foundation, suspension, and tracking mechanisms for receivers and concentrators are enabled to be simpler, lighter, and less expensive.

Some embodiments of a concentrated solar system inside a glasshouse have an array of relatively large 2-D-freedomed, 1-D-solar-tracking parabolic troughs suspended from fixed roof locations.

According to various embodiments, concentrators are made entirely or partially of thin-gauge aluminum foil, reflective film, or other relatively reflective and lightweight materials. Some of the materials have higher reflectivity than glass mirrors. Concentrators, in some embodiments, are foam core combined with reflective material, enabling concentrators weighing less than one kg per square meter. Lightweight construction, in some usage scenarios, reduces one or more of costs associated with production, transportation, and installation of concentrators. Total weight for some enclosed concentrated solar energy embodiments (including exoskeleton and protected collector) is less than 20 kg per square meter of concentrator.

The glasshouse structure is primarily fixed and immobile, and tracking systems control and aim the less than one kg per square meter concentrators inside the structure in an environment having relatively small wind forces.

Integration of Receiver and Greenhouse Structure

In some embodiments, a receiver and concentrator are suspended from superstructure of an enclosing greenhouse, enabling use of substantial support infrastructure of structure of the greenhouse. Lightweight receivers and troughs, hung from the greenhouse (e.g. roof structure, trusses, and/or end posts), are held in place and aimed with relatively small members that exert force mostly in tension, thus avoiding use of relatively larger members compared to structures held in place and moved with members in compression and subject to bending. The receiver is suspended at a fixed position relative to the greenhouse and the concentrator is suspended with its focal line held on the receiver but able to rotate around the receiver to track the daily and/or seasonal motion of the sun.

Design of Hanger, Rotating Joint and Bearing

In some embodiments, a hanger with a rotating joint is held in place suspended from roof superstructure of a greenhouse. A receiver tube is rigidly connected to the hanger, thus supporting the receiver tube. The rotating joint is connected to the hanger with a bearing enabling the joint to rotate around the receiver tube. A trough is suspended from the rotating joint. All the weight of the joint and the trough is carried by the rotating joint, through a bearing and to the hanger and then up to the roof superstructure. The rotating joint is enabled to rotate for small adjustments during the day, through about ½ turn from winter to summer, and another ½ turn back from summer to winter. In some usage scenarios, during an entire lifetime of the joint, it rotates the equivalent of no more than 100 revolutions and never needs to rotate more than about 1 rpm. The hearing and the rotating joint are designed to avoid shading the receiver tube and to withstand high temperatures (e.g. hundreds of degrees C.) since the bearing and the joint are necessarily in close thermal proximity to a high temperature thermal medium and the receiver tube.

Concentrated Solar Energy System

Industrial scale concentrated solar power systems, in some embodiments, cover multiple acres of land, with large-scale systems practical in the hundreds of acres. FIG. 1 illustrates a perspective view of selected details of an embodiment of an enclosing greenhouse and an enclosed concentrated solar energy system for a small portion of a system. Greenhouse 25 has low internal shading and low cost. According to various embodiments, the greenhouses are less than an acre to hundreds of acres in size. Suitable commercial greenhouses are available with short lead times from various vendors. Additionally, in some usage scenarios, there is a market for used greenhouses, enabling relatively easier financing of large-scale concentrated solar energy projects, such as described herein.

An optional dehumidification system reduces internal relative humidity, enabling, in some operating conditions, an extended usable lifetime of reflector materials and/or control electronics. Condensation (e.g. that occurs on a daily basis in some seasons in some locations) causes bonding of dust to surfaces and leads to corrosion reactions. Airborne humidity also accelerates corrosion reactions and performance degradation in reflector materials, as is well-understood and well-documented in lifecycle evaluations of reflector materials for concentrating solar systems. The optional dehumidification system (used, e.g., for managing relative humidity) enables using less robust and less humidity-resistant reflective concentrator materials, resulting in cost reductions and/or performance improvements, in some embodiments and/or usage scenarios.

In some embodiments, many troughs are enclosed in a single greenhouse with one front trough 27 and all the rest rear troughs such as 28. In some embodiments, the troughs are aligned east/west, with troughs facing the equator as illustrated, and track seasonal movement of the sun. In some embodiments, the troughs are aligned north/south (not illustrated).

In FIG. 1, line-focus solar receivers are illustrated suspended from receiver pipes 12 that are in turn suspended from the roof of the enclosing greenhouse. Line-focus solar concentrators are suspended from associated solar receivers so that the focal point of the concentrator is held relatively fixed on the receiver while the concentrator body remains free to rotate around the receiver (in one degree of freedom) to track daily and seasonal motions of the sun. The arrangement of relatively fixed receivers and concentrators that rotate around the receivers to track the sun is enabled, at least in part, by low weight of the concentrators and absence of wind forces on the concentrators.

Various embodiments suspend receiver pipes 12 and pipes 8 from trusses 1 or horizontal lattice girders. In some embodiments, solar receivers, such as implemented in part by receiver pipe 12, are interconnected through a series of thermally insulated pipes (such as pipe 8). The insulated pipe connects the trough receiver pipe to a next trough receiver pipe to complete a thermal fluid circuit.

Shape of Trough and Definitions of Terms and Formula

Figure 2:
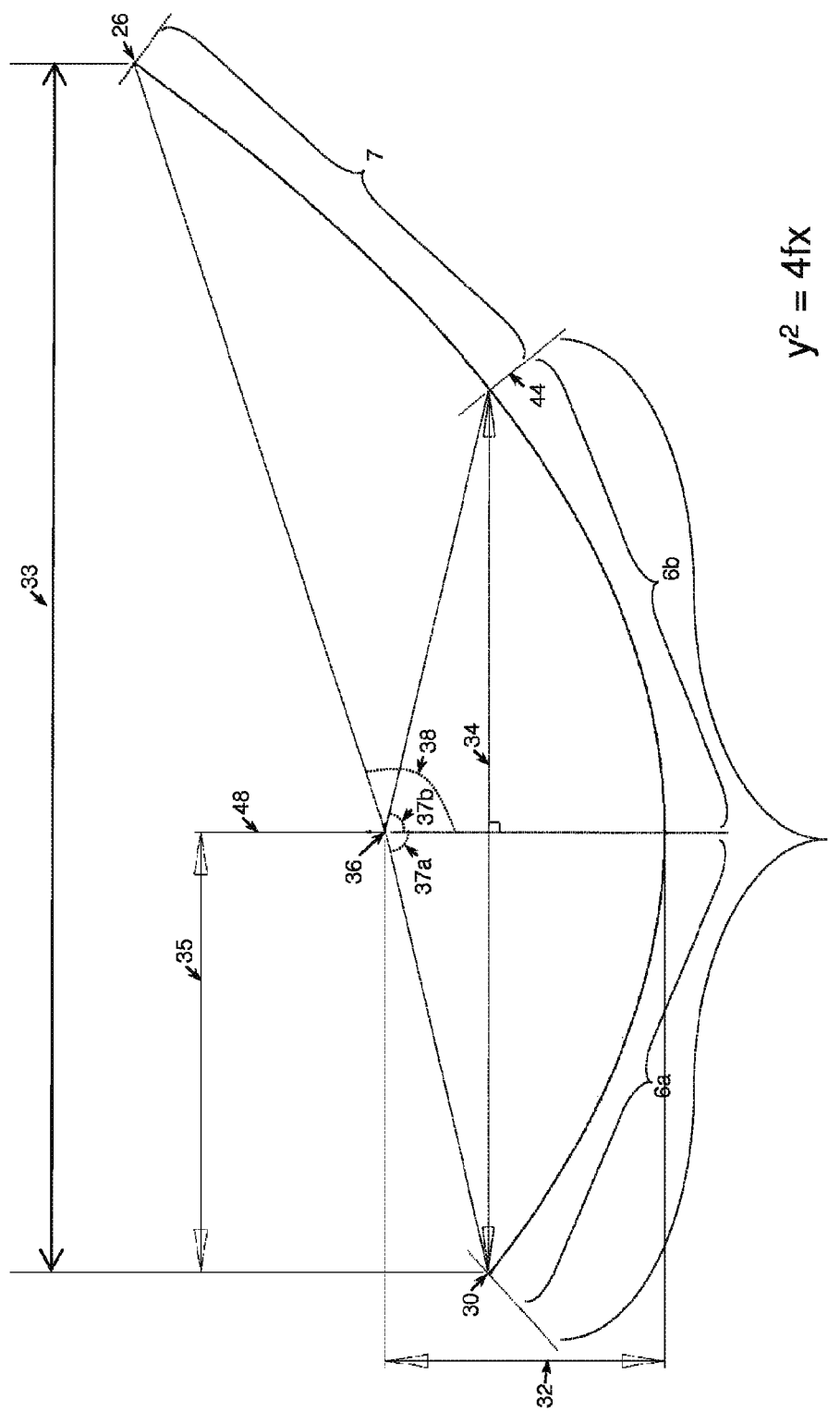
FIG. 2 illustrates a cross-section view of a bilaterally symmetric trough with a symmetric portion and a unilateral extension collectively having one continuous shape.

FIG. 2 illustrates a shape of a parabolic trough with an extension, such as an embodiment of an asymmetric (parabolic) trough. The shape of the parabolic trough is defined by the formula $y^2=4$ fx. With example values described following, an example parabola is defined by the formula $y^2=5.8$ x, where $-2.29<x<4$. A primary symmetric portion includes two symmetric base trough sections 6a and 6b referred to and illustrated collectively as base trough section 6, and also sometimes referred to as (symmetric) base portion (of the trough). A secondary extended portion includes extended trough section 7, and is, in some embodiments, a unilateral extension of the parabolic shape. Bottom of trough 26 is the edge of the trough that is closest to the ground when the trough is held vertical to face the sun low in the sky. Top of trough 30 is the edge of the trough that is furthest from the ground when the trough is held vertical. In some embodiments, bottom of trough 26 is the edge of extended trough section 7, and is further from the ground when the trough is horizontal, pointed at the sun high in the sky (as illustrated in FIG. 2, given an orientation of the trough such that construction line 34 is essentially horizontal to the ground). Trough focal length, illustrated by construction line 32 (e.g. having a value of 1.45 meters), is represented by the symbol f. A symmetric trough has an aperture (referred to as a base aperture in a trough with an extension), defined by a construction line between its two edges, such as illustrated by construction line 34 across the symmetric portion and ending at construction line 44, denoting intersection of the primary and the secondary portions of the trough. Construction line 35 represents a half-portion of construction line 34 (e.g. having a value of 2.29 meters). Construction line 33 indicates an extended aperture (e.g. having a value of 6.29 meters) of the asymmetric trough (referred to simply as the aperture where clear from context), including base trough section 6 and extended trough section 7. In some embodiments, extended trough section 7 is optionally movably connected to base trough section 6, is optionally enabled to change shape and/or is optionally enabled to change focus at an intersection defined by construction line 44. Construction line 48 defines an axis of symmetry of the symmetric base portion of the trough and runs from the intersection of base trough sections 6a and 6b through focal point 36. Angles 37a and 37b are base rim angles (sometimes referred to as the base rim angle for clarity) of the symmetric portion of the trough. Angle 38 is the extended rim angle of the extended portion.

Selected Details of a Movable Hinged Extension

FIG. 3 illustrates certain details of a parabolic trough with an extension, a receiver pipe, and an associated suspension mechanisms in a context free of other details to make certain details easier to understand. Extension suspension member 5 is representative of embodiments with fixed and/or movable extension suspension members, as appropriate. In the illustrated embodiment, the extension is hinged via hinged section connector 13, and has two sections fixedly connected via section connector 15.

In some embodiments, construction and suspension of a trough is accomplished by pinning together various elements, including suspension members 4 and 5, base trough section 6, and extended trough section 7. Each segment of the concentrator is made from pre-formed mirror surfaces having sufficient internal structure to hold shape and curvature without use of other elements, while under the force of gravity and small forces imposed by suspension and positioning. The concentrators are enabled for inside use, protected by a greenhouse, and so are not strong enough to withstand wind force or environmental elements such as rain and dust. Suspension members are either light rigid members or wires. In either case, the suspension members connect to the concentrator surface, joint, hanger, or roof superstructure with pins that are readily insertable for assembly and readily removable for service.

Notes Regarding Selected Figures

Note that that in various embodiments, one or more of FIGS. 5a, 5b, 6a, 6b, 6c, 7a, 7b, 7c, 8a, 8b, 8c, 9a, 9b, 9c, 10, 11, 12, 13a, 13b, and 13c, are not to scale. Note that in various embodiments, one or more of FIGS. 5a, 6a, 7a, 8a, and 9a, are "conceptual" plan views for clarity of presentation, in that the respective illustration is as if the curvature present in the respective embodiment were not present.

Sandwich Structured Composite Solar Concentrators

In some embodiments and/or usage scenarios, enclosing solar concentrators in a protecting structure enables the solar concentrators to be less robust than otherwise, since the enclosed solar concentrators are unaffected by environmental forces and/or hazards external to the structure (such as wind, rain, dust, dirt, or hail). Solar concentrators that hold shape to a relatively high degree of accuracy over time and throughout movement to aim at the sun enable efficient solar energy collection. In some embodiments and/or usage scenarios, deformation of collector/reflector shape causes reflected light to miss solar receivers and be wasted. In some situations, wind is the largest force acting on solar concentrators located external to a protecting structure. In some embodiments and/or usage scenarios, gravity and forces applied to aim collectors/reflectors are the largest forces acting on solar concentrators located internal to a protecting structure.

In some embodiments, sufficiently stiff, lightweight, and inexpensive solar concentrators are built of sandwich structured composites (see, e.g., http://en.wikipedia.org/wiki/Sandwich_structured_composite for an introduction to sandwich structured composite materials) and do not need external support structure. Such frame-less mirrors are a monocoque (see, e.g., http://en.wikipedia.org/wiki/Monocoque for an introduction to monocoque structures) structure where the majority of structural stress is carried in the skin of the structure.

Figure 4:
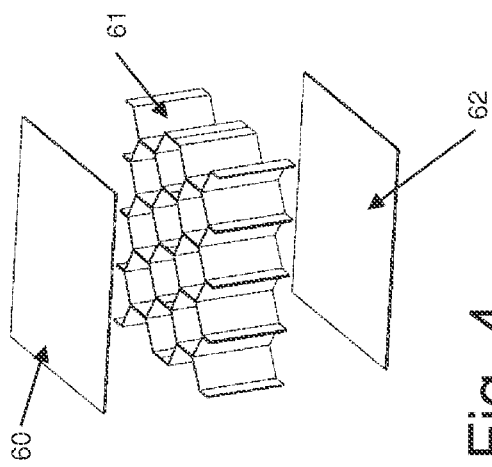
FIG. 4 illustrates in exploded perspective view a section of a sandwich structured composite with a honeycomb core.

FIG. 4 illustrates in exploded perspective view a section of a sandwich structured composite with a honeycomb core. The sandwich structure includes front skin 60, core 61, and rear skin 62.

Figure 5B:
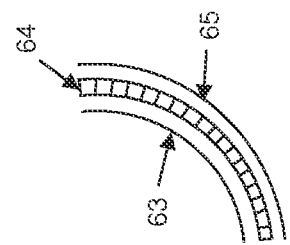
FIG. 5b illustrates, in exploded section view referenced to Section line 66 in FIG. 5a, an embodiment of mirror construction via a sandwich structured composite having two skins and one core, with no material removed.
Figure 5A:
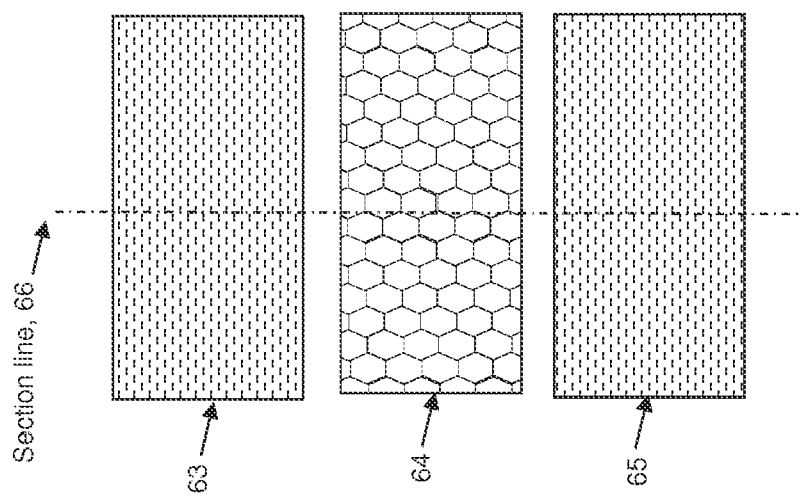
FIG. 5a illustrates, in plan view, an embodiment of mirror construction via a sandwich structured composite having two skins and one core, with no material removed. Each layer is illustrated separately, not as stacked during construction.

FIGS. 5a and 5b illustrate, in plan and exploded section views, some features of a sandwich structured composite used to form a parabolic trough solar concentrator. In various embodiments, front skin 63 that forms the mirror surface of a solar concentrator is made from polished aluminum sheet, back surface mirrored glass, or front surface mirrored glass. In various embodiments, core 64 (with the honeycomb illustrated much larger than scale) is made from aluminum honeycomb or foam sheet. In some embodiments, rear skin 65 is made from aluminum sheet or steel. Materials are selected of appropriate thickness to provide required strength (e.g. stiffness) against relatively local deformation, (e.g. due to thermal expansion and/or manufacturing variations) as well as relatively global lengthwise, widthwise, and/or twisting (torsional) deformation of the trough. For a solar concentrator of 7.5 meters aperture, 1.95 meters focal length and 17.5 meters length, a front aluminum skin of 0.4 millimeters thickness with an aluminum honeycomb core of 40 millimeters thickness and a rear aluminum skin of 0.2 millimeters thickness is suitable and is optionally supportable only at 4 points (two on the edge of the trough, and two in the middle of the trough) every 2.5 meters along the length of the trough by supporting rods and/or supporting cables from above. A solar concentrator built with these materials weighs, in some embodiments, less than 4 kilograms per square meter. Materials are selected with appropriately matched thermal expansion characteristics to avoid deformation stress as the solar concentrators experience a range of temperatures that in some embodiments, extends from −20 degrees Celsius to 80 degrees Celsius. In some embodiments, heat activated glue is used to bond the front skin, the core and the rear skin.

Enhanced Sandwich Structured Composite Solar Concentrators

Figure 6C:
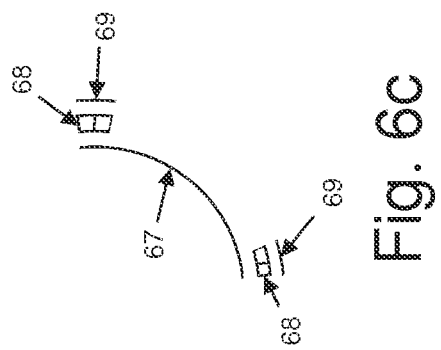
Figure 6B:
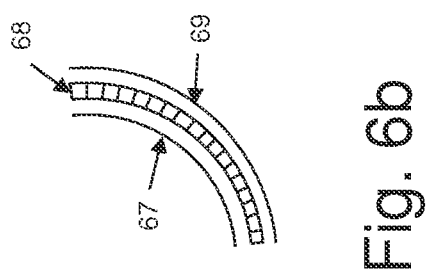
Figure 6A:
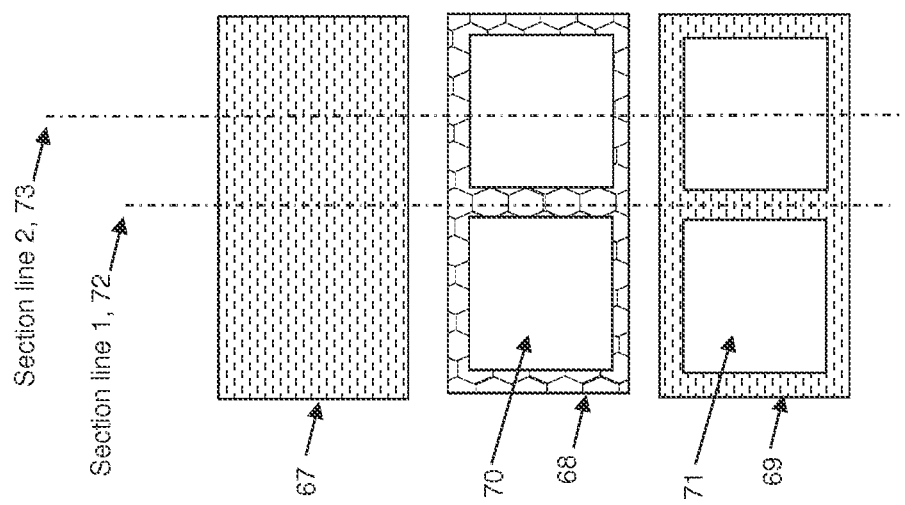
FIG. 6a illustrates, in plan view, an embodiment of mirror construction via a sandwich structured composite having two skins (front and rear) and one core, with sections removed from the core and the rear skin. Each layer is illustrated separately, not as stacked during construction.

In some embodiments, as illustrated in FIGS. 6a, 6b, and 6c, front skin 67 is sufficiently strong such that portions of a concentrator are constructed of a front skin alone with no sandwich in those areas. In some embodiments, the front skin thickness is selected to provide stiffness against local deformation without need for core or rear skin. Other portions of the concentrator use, in some embodiments, added strength provided by sandwich structure, such as illustrated by core 68 (with the honeycomb illustrated much larger than scale) and rear skin 69. In some embodiments, curvature of a concentrator trough is maintained by sandwich structure portions widthwise from top to bottom of the trough at periodic intervals. In some embodiments, a shape of a trough along its length is maintained by sandwich structure portions from edge to edge lengthwise. In some embodiments, such as illustrated in FIGS. 6a, 6b, and 6c, lengthwise and widthwise sandwich structure portions are formed from a single piece of material with portions removed (e.g. removed material 70 and 71).

In some embodiments, such as illustrated in FIGS. 7a, 7b, and 7c, front skin 74 is backed by sandwich portions that are formed from strips of core 75 (with the honeycomb illustrated much larger than scale) and rear skin 76 portions that are placed widthwise as illustrated, and/or lengthwise (not illustrated). In some embodiments, solar concentrators constructed with enhanced sandwich structured composites with portions of core or rear skin material removed are lighter and/or use less material than sandwich structures without material removed.

Figure 9C:
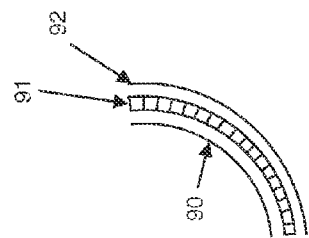
Figure 9B:
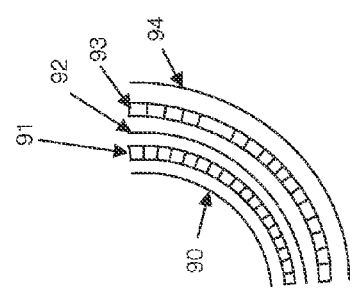
Figure 9A:
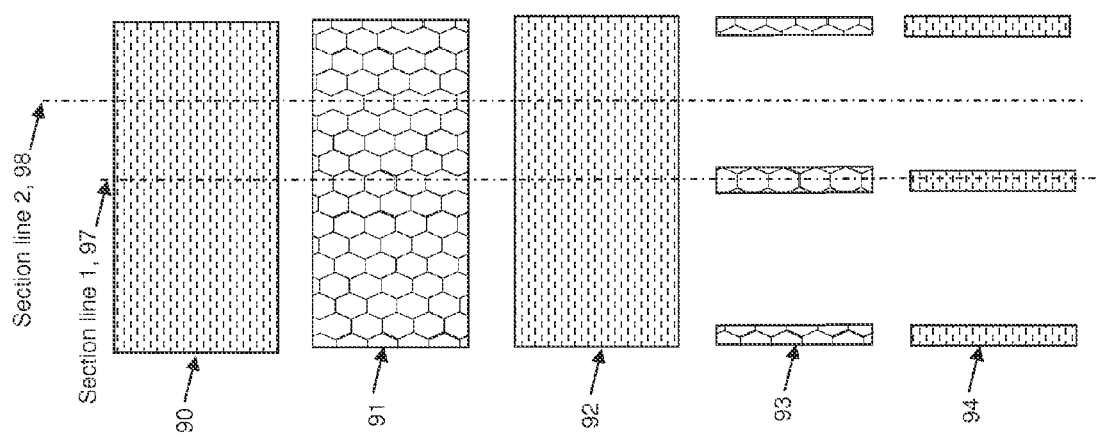
FIG. 9a illustrates, in plan view, an embodiment of mirror construction via a sandwich structured composite having three skins (front, middle, and rear) and two cores (front and rear), with the rear core and the rear skin sections built from strips of material. Each layer is illustrated separately, not as stacked during construction.

In some embodiments, thin (such as 10 mm) core material is enabled to resist some forces (such as local deformations) but thicker (such as 50 mm) core material is enabled to resist other forces (such as lengthwise and/or widthwise forces). In some embodiments, core material is selected to satisfy the thickest core requirement. In some embodiments, such as illustrated in FIGS. 8a, 8b, 8c, 9a, 9b, and 9c, triple skin sandwich structured composite construction is employed. In some embodiments, thin front core 81/91 (such as 10 mm honeycomb) is used between front skin 80/90 and middle skin 82/92. Thick (such as 50 mm honeycomb) rear core 83/93 is used between middle skin 82/92 and rear skin 84/94, while rear core 83/93 and rear skin 84/94 have selected portions removed 85 and 86, respectively (as illustrated in FIGS. 8a, 8b, and 8c), or are ribbed (as illustrated in FIGS. 9a, 9b, and 9c).

In some embodiments, (not illustrated) of a triple skin structured composite, a rear core and a rear skin are constructed from multiple strips of material used on portions of a concentrator. In some embodiments, a hybrid solar concentrator is constructed using a triple skin structured composite (conceptually replacing selected areas of a double skin structured composite of a first type). The hybrid solar concentrator weighs less and/or uses less material than a solar concentrator using a double skin structured composite (of the first type or a second type) without using the triple skin structured composite. In various embodiments, solar concentrators constructed with enhanced sandwich structured composites weigh less than 3 kilograms per square meter.

Construction and Transportation of Solar Concentrators

Sandwich Structured Composite Solar Concentrators are, in some embodiments, pre-formed in a factory using a heated mold. In some embodiments of a construction process, front material is first placed over a lower mold having a desired curvature of a concentrator or a concentrator section. In some embodiments, Front material is held temporarily in a proper shape next to the mold by vacuum applied through holes in a face of the mold. Next glue is applied as a film, a spray or other application scheme. Next core material is applied. Next glue is again applied. Finally rear skin material is placed over the core and a top mold is applied to place a concentrator sandwich formed from the previously assembled layers under pressure and heat to cure the glue. In some embodiments with triple skin sandwich construction, additional layers are applied either before the first glue is cured or in a later curing step.

In some embodiments, a full trough is constructed in a single operation. In some embodiments, such as where trough size is too large to form on a mold in a single piece, trough sections are constructed. In some embodiments, alignment holes or pins are added to troughs or trough segments during construction to be used during trough mounting at a destination after transportation.

In some embodiments, a full trough is too large for practical shipment to a destination. In some embodiments, a full trough or a trough section built on a mold is cut, in place, into smaller sections for convenience of transportation (e.g. shipping). In some embodiments where trough sections are cut, alignment holes or pins are added during manufacturing of the trough sections, the holes or pins for use in reconnecting the cut trough sections during trough mounting and/or assembly at a destination.

In some embodiments, such as illustrated in FIG. 10, a concentrator is constructed of multiple segments, each forming an entirety of a parabolic curve of a trough concentrator (conceptually represented by widthwise direction of trough and direction of trough curvature 101) and a portion of length (conceptually represented by lengthwise direction of trough and direction of axis of symmetry 100) of the trough concentrator. Each segment (illustrated, e.g., by one of multiple mirror segments 104) is connected to a next segment by flanges (illustrated, e.g. by one of multiple mirror connection flanges with integrated mirror suspension point 103) suspended from above at a fixed length from a solar receiver. A gap (illustrated, e.g., by widthwise gap between mirror segments 102) separates mirror segments lengthwise. In some embodiments, suspension rods or cables are pre-cut to an appropriate length. In some embodiments, the rods or the cables have a facility for fine adjustment of length. In some embodiments, pre placed holes and pins on concentrator segments and flanges are used for alignment. In various embodiments, concentrator segments and flanges are joined by fasteners, rivets, or glue. In some embodiments, one or more seams between trough segments are weak points. In some embodiments, segments of a trough are connected with sufficient strength to hold a shape of the trough. In various embodiments, additional trough suspension rods or cables are added at seams of a trough to hold the seams at a fixed distance from a solar receiver. In some embodiments, tape is applied across a length of a seam to further strengthen the seam.

Figure 11:
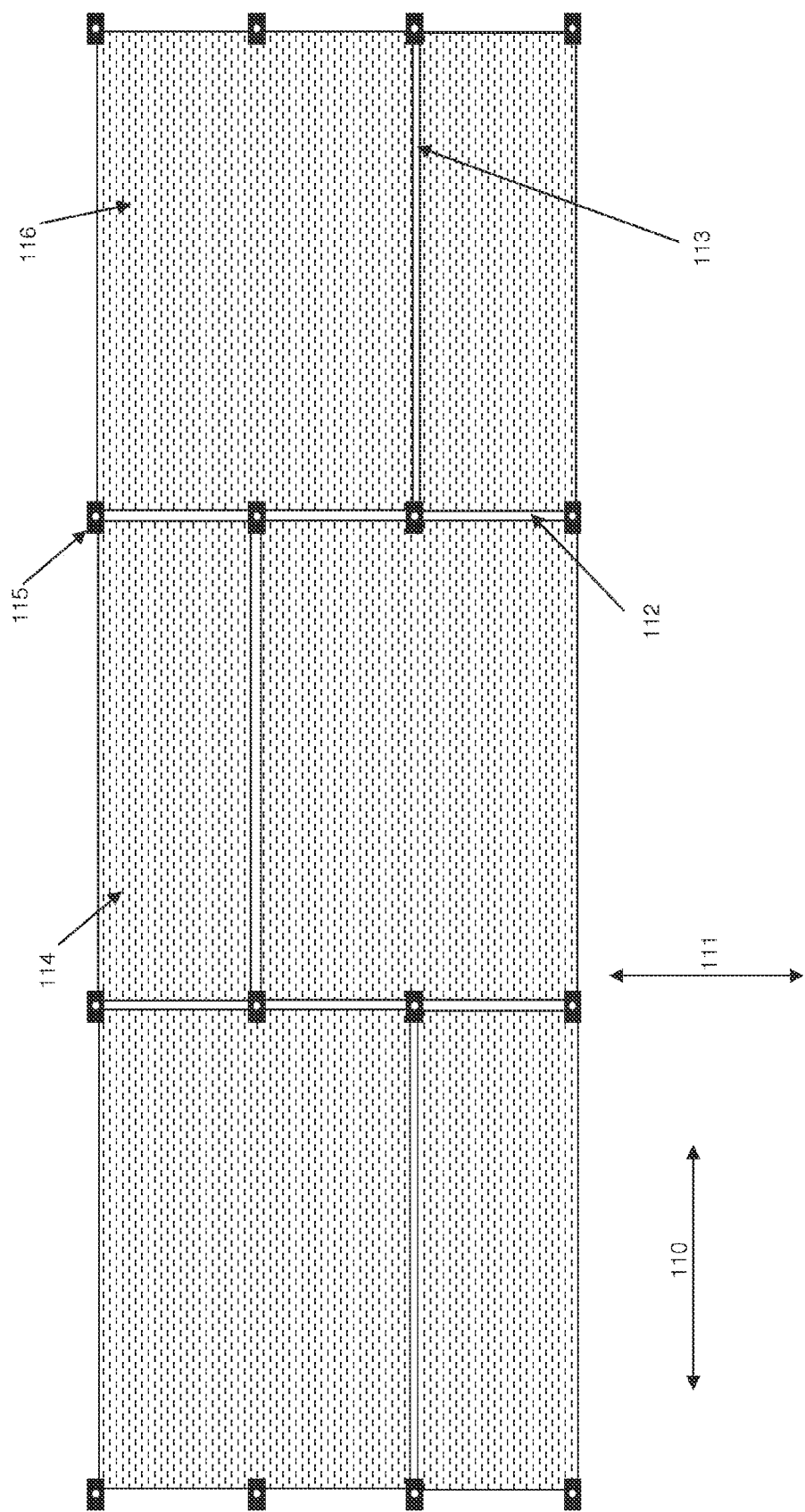
FIG. 11 illustrates, in plan view as seen from the back side of mirror, another embodiment of mirror construction via a sandwich structured composite having multiple pre-formed mirror segments, each segment implementing a portion of a full aperture of a mirror shape and a portion of a full mirror length of the mirror shape as joined by flanges.

In various embodiments, such as illustrated in FIG. 11, a concentrator is constructed of multiple segments with seams in the lengthwise direction (conceptually represented by lengthwise direction of trough and direction of axis of symmetry 110) and the widthwise direction (conceptually represented by widthwise direction of trough and direction of trough curvature 111). The segments are of various sizes and arranged in an interstitial pattern to avoid long seams along a length of a solar concentrator. The various sizes are illustrated, e.g., by one of multiple 'small' and 'large' mirror segments 114 and 116, respectively. Also illustrated are gaps between the mirror segments, as, e.g., widthwise and lengthwise gaps between mirror segments 112 and 113, respectively. A flange is illustrated by, e.g., one of multiple mirror connection flanges with integrated mirror suspension point 115.

Figure 12:
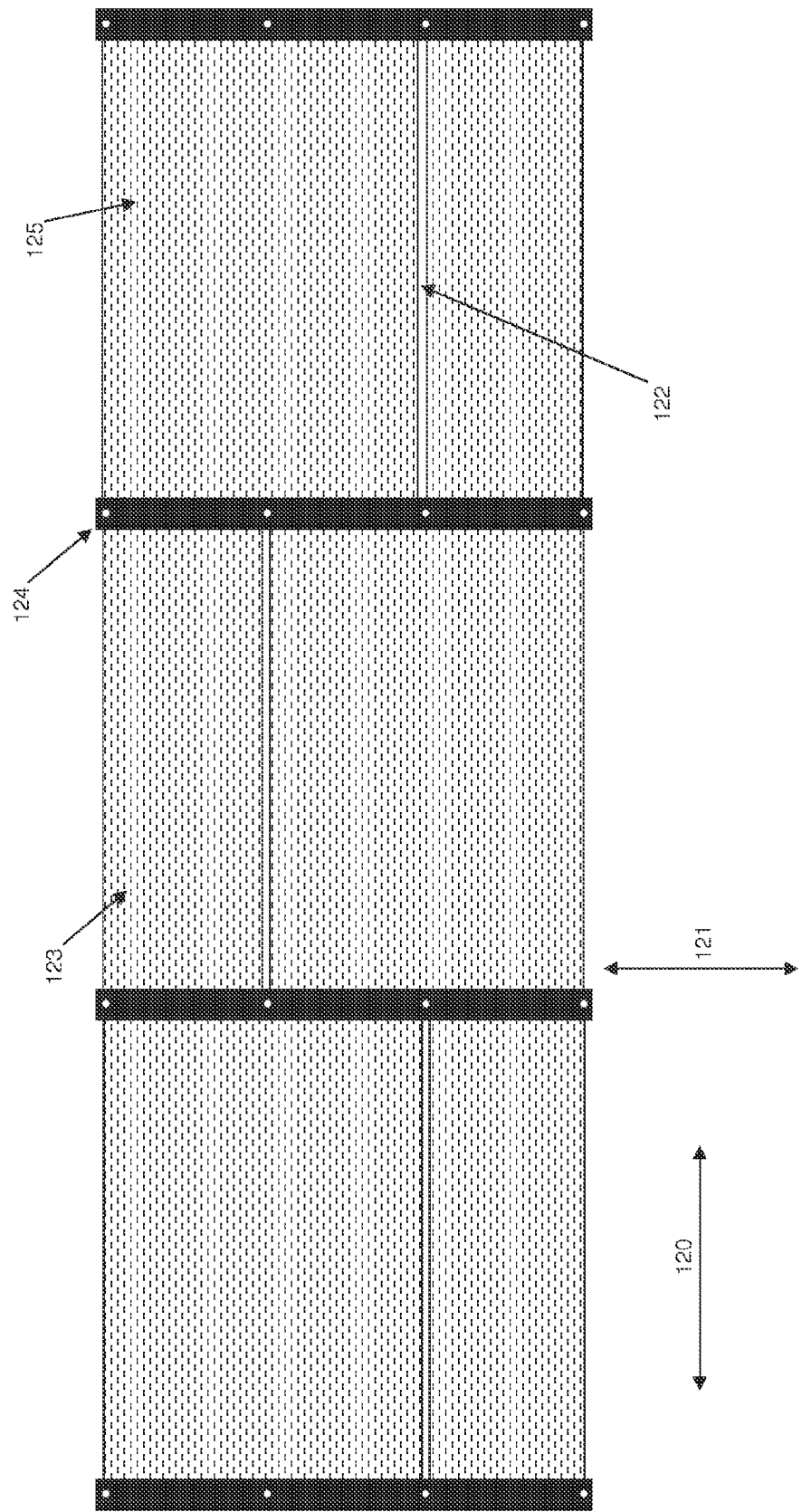
FIG. 12 illustrates, in plan view as seen from the back side of mirror, yet another embodiment of mirror construction via a sandwich structured composite having multiple pre-formed mirror segments, each segment implementing a portion of a full mirror aperture of a mirror shape, and a portion of a full mirror length of the mirror shape as joined by continuous ribs.

In some embodiments, such as illustrated in FIG. 12, a concentrator is constructed with gaps in the lengthwise direction (conceptually represented by lengthwise direction of trough and direction of axis of symmetry 120) and seams in the widthwise direction (conceptually represented by widthwise direction of trough and direction of trough curvature 121). Widthwise seams are connected between concentrator segments with ribs (illustrated, e.g., by one of multiple mirror suspension ribs with multiple mirror suspension points 124) rather than individual flanges (such as illustrated in FIG. 11). Various mirror sizes are illustrated, e.g., by one of multiple 'small' and 'large' mirror segments 123 and 125, respectively. Also illustrated are gaps between the mirror segments, as, e.g., gap between mirror segments 122. In some embodiments, mirror suspension ribs are constructed as sandwich structured composites. In some embodiments, mirror suspension ribs are pre-formed in a factory as connected to concentrator segments, with mirror suspension ribs extending beyond an edge of the concentrator segment to provide a connection mechanism for a next concentrator segment.

Figure 13B:
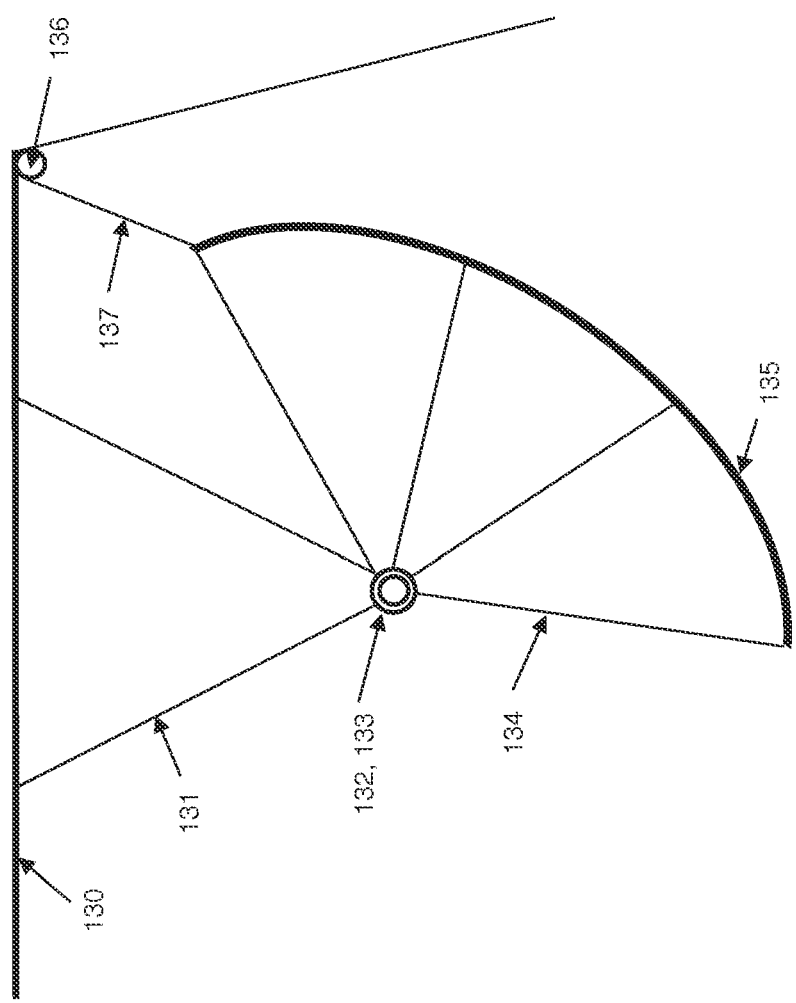
FIG. 13b illustrates the elements of FIG. 13a, with the mirror suspension mechanism in a vertical position.

In some embodiments, such as illustrated in FIGS. 13*a*, 13*b*, and 13*c*, ribs are suspended (e.g. from one or more solar receivers) during constructing within a glasshouse, enabling subsequent placement of elements (e.g. of one or more concentrator segments) on top of and fastened to the ribs during the constructing.

Active Control of Twisting Forces

In some embodiments and/or usage scenarios, a curved structure (e.g. a parabolic trough) is relatively resistant to force lengthwise orthogonal to a radius of curvature, due at least in part to the curvature. In some embodiments and/or usage scenarios, a curved structure built from a sandwich structured composite (e.g. a sandwich-composite-based parabolic trough) is relatively resistant to force along a radius of curvature, at least in part due to the sandwich structure composite. In some embodiments and/or usage scenarios, a curved structure built from a sandwich structured composite (e.g. a sandwich-composite-based parabolic trough) is, at least in part, further strengthened against the force of gravity by suspension rods and/or suspension cables of a fixed length suspended from a solar receiver. In some embodiments and/or usage scenarios, an "open" curved structure (e.g. a parabolic trough) is not relatively resistant to torsion forces, due at least in part to the curved structure being open rather than closed (e.g. a parabola instead of a complete circle or ellipse).

In various embodiments, trough concentrators are stiffened against torsion force deformation via a torque tube or torque box running the length of the concentrator (behind so as not to block incident light) and ribs extending from the torque tube or the box to the rear of the concentrator. In various embodiments, the torque box or the torque tube and the extending ribs add substantial weight and cost to the concentrator.

FIGS. 13*a*, 13*b*, and 13*c* illustrate, in various views and positions, a trough embodiment. Illustrated are roof superstructure 130, receiver suspension cable/rod 131, mirror suspension cable/rod 134, mirror suspension rib 135, positioning cable 137, and positioning pulley 136. Further illustrated are solar receiver pipe 132 (the inner of the two concentric circles of FIG. 13*a* and FIG. 13*c*) and pipe hanger/mirror bearing 133 (the outer of the two concentric circles of FIG. 13*a* and FIG. 13*c*).

In various embodiments, such as illustrated in FIGS. 13*a*, 13*b*, and 13*c*, a concentrator is pulled by an edge at multiple points along the length of the concentrator to position the concentrator facing the sun. Multiple fixed length rods or cables suspend the concentrator at a fixed distance (focal length) from a receiver. Multiple positioning rods or positioning cables (either in line with the suspension rods or the suspension cables or at separate points lengthwise along the concentrator) are pulled to position the concentrator more vertically when the sun is low in the sky and eased to position the concentrator more horizontally when the sun is high in the sky.

In various embodiments, the suspension rods or the suspension cables and the positioning rods or the positioning cables are all held almost exclusively in tension at all times. In some embodiments, the positioning cable is mounted on the concentrator on one end and on a roof superstructure at an extended distance from directly above the concentrator so that when the concentrator is raised the positioning cable pulls the concentrator to keep one or more of the suspension cables or the suspension rods in tension. If the suspension members or the positioning members were sometimes subject to compression, then the suspension cables could not be used and the suspension rods would need to be substantially larger. In addition to adding cost and weight to a system, the larger suspension rods would, in some embodiments, reduce efficiency by blocking additional incident light.

In some embodiments where concentrators are oriented lengthwise from east to west, positioning members (e.g. rods or cables) are only used on one side of the concentrators (as illustrated). In various embodiments where concentrators are oriented lengthwise from north to south, or some embodiments where concentrators are oriented lengthwise from east to west and having a center of gravity necessitating pulling at times from one side and at times from the other to properly track the sun during all daylight hours, positioning members are used on both sides of the concentrators (not illustrated).

Where multiple positioning rods or positioning cables are placed lengthwise along a concentrator, torsional forces are reduced and/or minimized, in some embodiments, with no additional strengthening of the concentrator against torsional distortion. In some embodiments, all positioning rods or positioning cables on one side of a concentrator are moved together by one motor or by multiple motors controlled together by one sensor system. In some embodiments, fine tuning of aiming is achieved by moving individual positioning cables under control of separate motors and using local sensors to determine optimal positions of the individual positioning cables. In some embodiments where multiple motors are controlled separately by respective positioning control systems, additional resilience is achieved against failure of any one of the motors or any one of the positioning control system because the other motors under control of their individual positioning control systems remain enabled to aim the concentrator.

Concentrator Suspension Mechanism Design Considerations

Figure 14A:
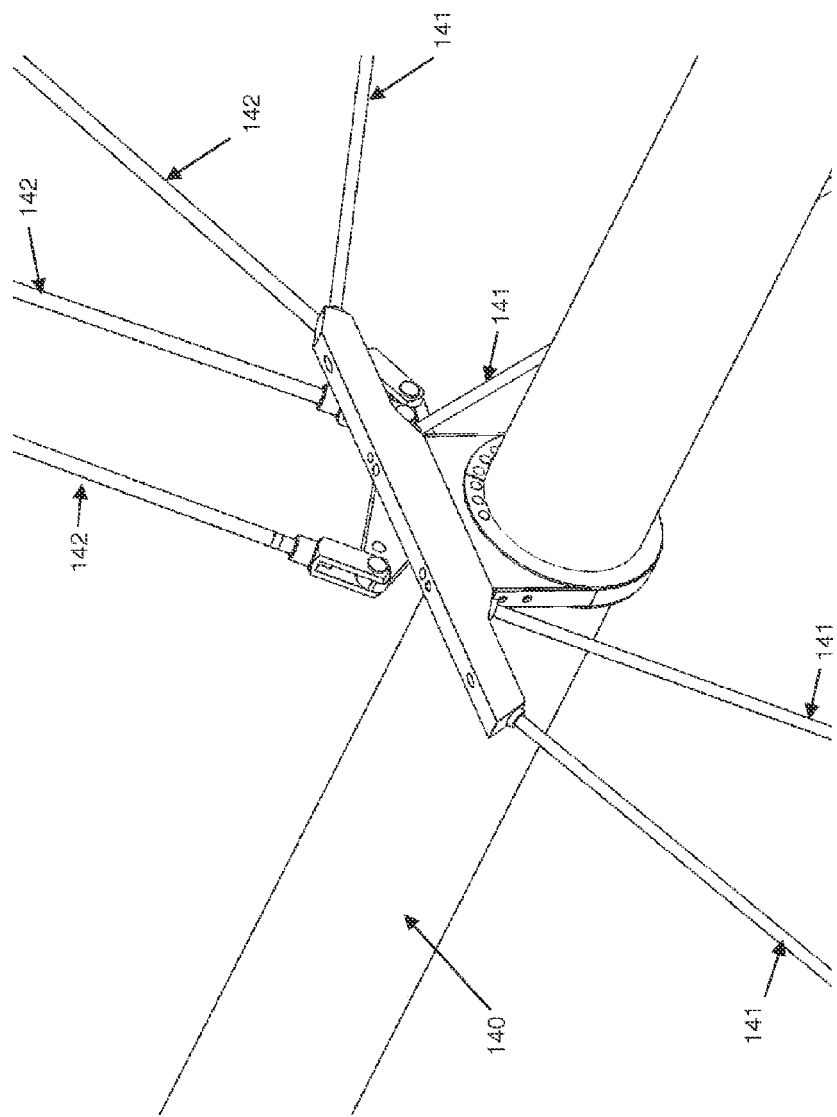
FIG. 14a illustrates, in perspective view, an embodiment of a bearing mechanism connecting a solar receiver to a solar concentrator and to building superstructure.
Figure 14B:
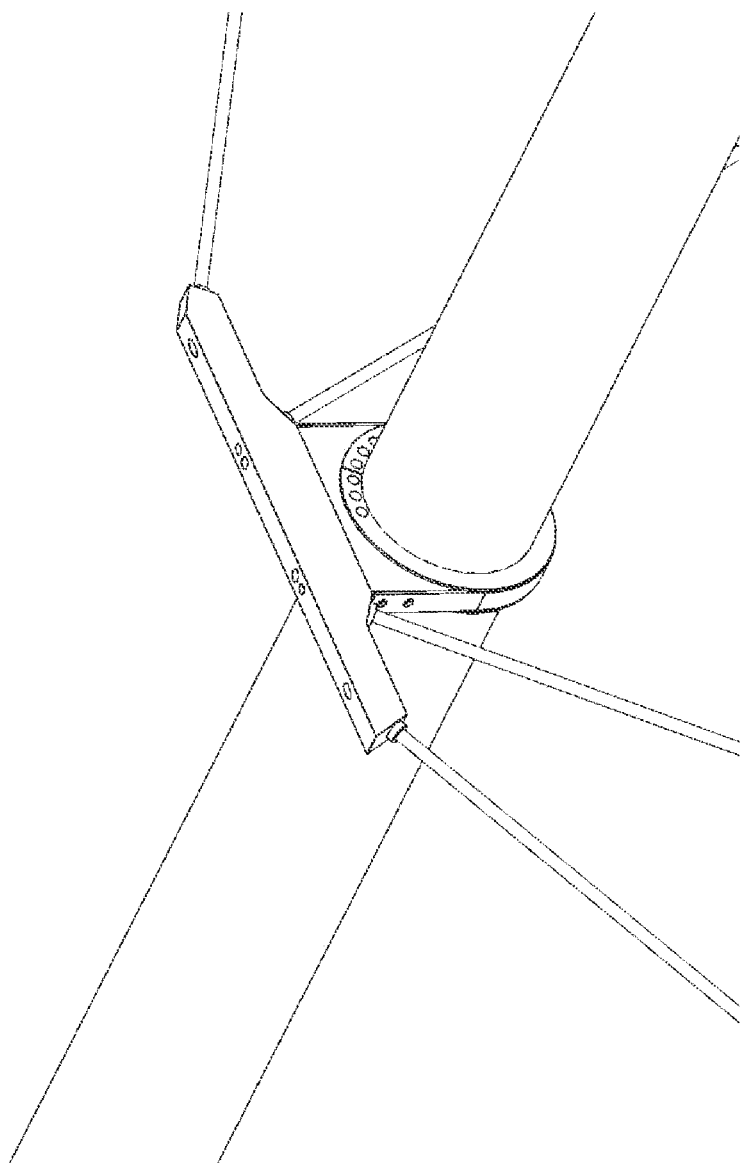
FIG. 14b illustrates selected details of FIG. 14a, with elements connecting to the building superstructure omitted for clarity.
Figure 14C:
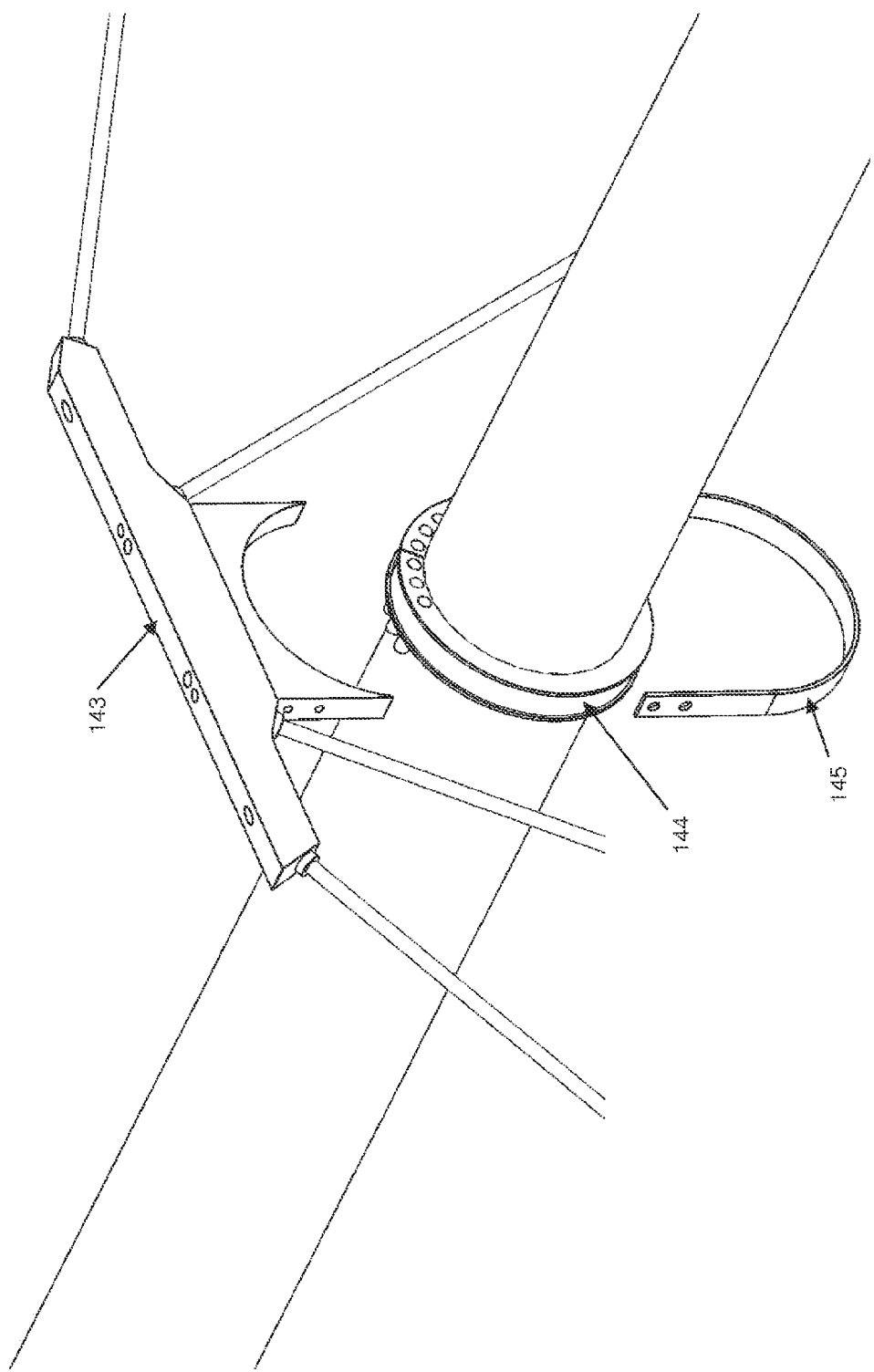
FIG. 14c illustrates FIG. 14b in exploded view.

FIGS. 14a, 14b, 14c, and 14d illustrate, in various views, an embodiment of a bearing mechanism connecting a solar receiver to a solar concentrator (not illustrated) and to building infrastructure (not illustrated). Illustrated and specifically identified in FIG. 14a are solar receiver 140, solar concentrator suspension rod 141 (multiple instances), and solar receiver suspension rod 142 (multiple instances). Illustrated and specifically identified in FIG. 14c are concentrator hanging top portion with bearing outer ring 143, split bearing raceway 144, and concentrator hanger bearing strap 145. Illustrated and specifically identified in FIG. 14d are receiver hanger 149. six fasteners 146 connecting split bearing raceway 144 to receiver hanger 149 and split ring tightening mechanism, and bolt 148 to attach solar receiver hanger 149 to solar receiver 140 by closing ring to specified torque. Also identified in FIG. 14d are solar receiver 140, solar receiver suspension rod 142 (multiple instances), and split hearing raceway 144.

In some embodiments, a continuous solar receiver is a combination (e.g. connected in series and/or in parallel) of out (e.g. outlet) and back (e.g. inlet) pipes suspended from a roof of a greenhouse, attached at one end to a wall of the greenhouse and free to move at the other end. The suspension mechanism enables a continuous solar receiver to expand and contract as the continuous solar receiver heats and cools while being held in straight lines by a suspension mechanism. A solar concentrator is suspended from the continuous solar receiver with a focal line of the solar concentrator fixed on the solar receiver and with the solar concentrator enabled to rotate around the continuous solar receiver to track the sun. In some embodiments, a mechanism to connect a solar receiver to a greenhouse roof and a solar concentrator to the solar receiver is built from a single joint clamped to the solar receiver as illustrated in FIG. 14a. A clamping mechanism enables tightening of the joint mechanism to the solar receiver while allowing for manufacturing variation in an outside diameter of the solar receiver. Structure of the joint structure is illustrated with various elements omitted in FIGS. 14b, 14c, and 14d. FIG. 14b omits elements of FIG. 14a that connect to the building superstructure, and FIG. 14c is an exploded view of FIG. 14b. FIG. 14d omits elements of FIG. 14a that connect to the solar concentrator.

In some embodiments, light is reflected by a solar concentrator and is incident upon a joint mechanism. In some embodiments, joint mechanism width is minimized so as to block as little incident light as possible. In some embodiments, as illustrated in FIG. 14c, a concentrator suspension mechanism is built with a thin strip of material forming an outer portion of a rotating bearing (operable as a concentrator hanger bearing strap) to minimize an amount of material between incident light reflected by a solar concentrator and a solar receiver under a joint mechanism. The thinness of the concentrator hanger bearing strap is enabled by the concentrator bearing rotating only through part of a full circle and always maintaining a position such that weight on the solar concentrator is supported by concentrator hanging top portion with bearing outer ring 143. The thin concentrator hanger bearing strap provides a low resistance thermal path between a concentrator and a concentrator hanger top portion. In some embodiments, a concentrator hanger bearing strap is coated with a selective coating the same as or similar to a selective coating applied to a solar receiver to maximize absorption of incident solar radiation and/or to minimize emission of radiation from the solar receiver when heated. In some embodiments, a concentrator hanger bearing strap is coated with a non-selective coating to maximize absorption of incident solar radiation but to allow emission of radiation from a concentrator hanger hearing strap in case a thermal path between a concentrator hanger hearing strap and a solar receiver is insufficient to maintain the concentrator hanger bearing strap below a maximum operating temperature.

Selected Embodiment Details

In various embodiments and/or usage scenarios, the illustrated embodiments are related to each other. For example, in some embodiments and/or usage scenarios, mirrors, as depicted in FIGS. 5a, 5b, 6a, 6b, 6c, 7a, 7b, 7c, 8a, 8b, 8c, 9a, 9b, and 9c, are implementation techniques for all or any portion(s) of solar concentrators (e.g. of FIGS. 1, 13a, and 13b), reflective surface(s) of troughs (e.g. of FIG. 2), and mirrors (e.g. of FIG. 3). For example, in some embodiments and/or usage scenarios, positioning member 9 of FIG. 1 is an alternate embodiment of positioning cable 137 of FIGS. 13a and 13b.

While the forgoing embodiments are described as having roof systems with peaks and gutters, other embodiments use alternate roof systems, such as peaked, arched, mansard, and Quonset-style roof systems, as well as variations and combinations thereof. In various embodiments, a partially transparent protective enclosure (such as a glasshouse or a greenhouse) uses glass to provide the transparency, and other embodiments use alternative transparent materials such as plastic, polyethylene, fiberglass-reinforced plastic, acrylic, polycarbonate, or any other material having suitable transparency to sunlight and sufficient strength (in combination with a supporting framework) to provide environmental protection.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible, consistent with the description, and are within the scope of the claims of the issued patent. The names given to elements are merely exemplary, and should not be construed as limiting the concepts described. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, operations, functions, or portions thereof.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other applications, and are not limited to the particular application or industry of the described embodiments. The invention is thus to be construed as including all possible modifications and variations encompassed within the scope of the claims of the issued patent.

What is claimed is:

1. A system comprising:
    a front layer having outer and inner surfaces, the front layer being reflective to incident solar radiation;
    a honeycomb core layer;
    a rear layer having outer and inner surfaces;
    wherein at least a portion of the honeycomb core layer is situated between the inner surfaces of the front and the rear layers and is bonded directly to the inner surface of the front layer;
    wherein the front, the rear, and the honeycomb core layers are laminated to collectively have a weight of less than 4 kilograms per square meter, and operate as a line-focus solar energy concentrator of the incident solar radiation.

2. The system of claim 1, wherein glue bonds the front layer, the honeycomb core layer, and the rear layer.

3. The system of claim 2, wherein the front layer comprises polished aluminum sheet, the honeycomb core layer comprises aluminum honeycomb, and the rear layer comprises aluminum sheet.

4. The system of claim 2, wherein the front layer comprises polished aluminum sheet, the core honeycomb layer comprises an aluminum honeycomb layer that is continuous in a direction transverse to a focal line of the solar energy concentrator, and the rear layer comprises aluminum sheet.

5. The system of claim 2, wherein the front layer comprises mirrored glass sheet and the rear layer comprises steel sheet.

6. The system of claim 2, wherein the front layer comprises one of polished aluminum sheet, back surface mirrored glass, and front surface mirrored glass.

7. The system of claim 2, wherein a cross-section of the bonded layers approximates a segment of a parabolic curve.

8. The system of claim 2, further comprising one or more ribs positioned to support a section of the bonded layers via the outer surface of the rear layer.

9. The system of claim 8, wherein the ribs are comprised of laminated composites.

10. The system of claim 1 wherein the front layer and the rear layer are each attached directly to the honeycomb core layer.

11. The system of claim 10 wherein at least one of the front layer and the rear layer includes a coating.

12. The system of claim 11 wherein the front layer includes back surface mirrored glass.

13. The system of claim 1 wherein the concentrator is positioned within a glass enclosure.

14. The system of claim 13 wherein the concentrator is suspended from an overhead structural element of the glass enclosure.

15. The system of claim 13, further comprising a dehumidification system positioned within the glass enclosure.

16. The system of claim 14, further comprising a plurality of independently controllable motors positioned along a length of the concentrator to rotate the concentrator.

17. The system of claim 16, further comprising a controller operatively coupled to the plurality of motors and programmed with instructions that, when executed, direct the motors to move the concentrator to track the sun.

18. The system of claim 16 wherein a first motor operates as a backup to a second motor.

19. The system of claim 16, further comprising a plurality of sensors coupled to corresponding motors.

20. The system of claim 14 wherein the concentrator is one of multiple concentrators, and wherein neighboring concentrators are connected end-to-end in a longitudinal direction.

21. The system of claim 1, further comprising:
    a glass enclosure in which the concentrator is positioned;
    a dehumidification system positioned within the glass enclosure;
    a plurality of independently controllable motors positioned along a length of the concentrator to rotate the concentrator; and
    a controller operatively coupled to the plurality of motors and programmed with instructions that, when executed, direct the motors to rotate the concentrator to track the sun,
    wherein:
        the concentrator is one of multiple concentrators, with neighboring concentrators connected end-to-end in a longitudinal direction, and
        at least one of the front layer and the rear layer includes a coating.

* * * * *